US008533759B2

(12) United States Patent
Yuki et al.

(10) Patent No.: US 8,533,759 B2
(45) Date of Patent: Sep. 10, 2013

(54) TERMINAL DEVICE, INFORMATION CORRECTION SERVER, PROGRAM INFORMATION CORRECTION METHOD, AND INFORMATION CORRECTION METHOD

(75) Inventors: Yasuhiro Yuki, Kanagawa (JP); Emi Tsurukiri, Tokyo (JP)

(73) Assignee: Panasonic Corporation, Osaka (JP)

( * ) Notice: Subject to any disclaimer, the term of this patent is extended or adjusted under 35 U.S.C. 154(b) by 416 days.

(21) Appl. No.: 12/668,541

(22) PCT Filed: Jul. 11, 2008

(86) PCT No.: PCT/JP2008/001871
§ 371 (c)(1),
(2), (4) Date: Jan. 11, 2010

(87) PCT Pub. No.: WO2009/008179
PCT Pub. Date: Jan. 15, 2009

(65) Prior Publication Data
US 2010/0186043 A1    Jul. 22, 2010

(30) Foreign Application Priority Data
Jul. 11, 2007  (JP) ................................ 2007-182686

(51) Int. Cl.
*G06F 3/00* (2006.01)
*G06F 13/00* (2006.01)
*H04N 5/445* (2011.01)

(52) U.S. Cl.
USPC .............. 725/50; 725/49; 725/58; 725/59; 386/292

(58) Field of Classification Search
None
See application file for complete search history.

(56) References Cited

U.S. PATENT DOCUMENTS 5,576,755 A    11/1996 Davis et al.
5,841,433 A *  11/1998 Chaney .......................... 725/50
(Continued)

FOREIGN PATENT DOCUMENTS

JP    61-129984    6/1986
JP    8-275077    10/1996
(Continued)

OTHER PUBLICATIONS

International Search Report issued Oct. 21, 2008 in International (PCT) Application No. PCT/JP2008/001871.

*Primary Examiner* — Jason J Chung
(74) *Attorney, Agent, or Firm* — Wenderoth, Lind & Ponack, L.L.P.

(57) ABSTRACT

To provide a program viewing-recording system which executes program viewing or recording without a failure when a program is viewed or recorded using a program list created by a third party.
In response to a user operation or an instruction from an application (107), a program information adjustment unit (110) obtains program information included in a program list from a program list management unit (109), compares the program information with broadcast program information held by a broadcast program information management unit (106), and corrects the program information on the basis of terminal setting data. When it is determined that the program information cannot be corrected using the information held by the broadcast program information management unit, the program information adjustment unit sends the program information and the terminal setting data to an external program information correction server (400) and requests the server to correct the program information. The application (107) of a program recording device (100) executes program viewing or recording using the program information corrected by the program information adjustment unit (110).

10 Claims, 33 Drawing Sheets

(a) Before correction

| Program information | |
|---|---|
| Title | Acoustic live |
| Date | 2004/10/11 |
| Start time | 21:00 |
| End time | 22:00 |
| Channel name | MMTV |
| Channel number | 1 |
| Category | Music |
| Keyword | JEANS Tom Mike David |
| Comment | Word has it JEANS will release a new song! |

(b) After correction

| Program information | |
|---|---|
| Title | Acoustic live |
| Date | 2004/10/11 |
| Start time | 23:00 |
| End time | 24:00 |
| Channel name | MMTV |
| Channel number | 2 |
| Category | Music |
| Keyword | JEANS Tom Mike David |
| Comment | Word has it JEANS will release a new song! |

(56) References Cited

U.S. PATENT DOCUMENTS

| | | |
|---|---|---|
| 6,526,577 B1 | 2/2003 | Knudson et al. |
| 7,051,360 B1 | 5/2006 | Ellis et al. |
| 7,487,527 B2 | 2/2009 | Ellis et al. |
| 7,694,319 B1* | 4/2010 | Hassell et al. ............... 725/34 |
| 7,930,719 B2 | 4/2011 | Ellis et al. |
| 8,001,563 B2 | 8/2011 | Knudson et al. |
| 2002/0056103 A1* | 5/2002 | Gong ............................ 725/39 |
| 2003/0149988 A1* | 8/2003 | Ellis et al. ..................... 725/87 |
| 2003/0233654 A1 | 12/2003 | Tsukamoto et al. |
| 2004/0230991 A1* | 11/2004 | Blackketter et al. ........... 725/31 |
| 2005/0204387 A1 | 9/2005 | Knudson et al. |
| 2006/0064721 A1* | 3/2006 | Del Val et al. ................. 725/41 |
| 2006/0143655 A1 | 6/2006 | Ellis et al. |
| 2007/0157250 A1* | 7/2007 | Morris .......................... 725/58 |
| 2007/0288958 A1 | 12/2007 | Knudson et al. |
| 2009/0003360 A1* | 1/2009 | Zhao et al. ................... 370/401 |
| 2009/0158347 A1 | 6/2009 | Ellis et al. |
| 2010/0205634 A1 | 8/2010 | Knudson et al. |
| 2011/0225613 A1 | 9/2011 | Ellis et al. |
| 2011/0258661 A1 | 10/2011 | Knudson et al. |

FOREIGN PATENT DOCUMENTS

| | | |
|---|---|---|
| JP | 2974784 | 9/1999 |
| JP | 2001-157188 | 6/2001 |
| JP | 2001-285834 | 10/2001 |
| JP | 2002-271711 | 9/2002 |
| JP | 2003-504984 | 2/2003 |
| JP | 2004-23268 | 1/2004 |
| JP | 2005-101875 | 4/2005 |
| JP | 2005-269411 | 9/2005 |
| JP | 2005-333274 | 12/2005 |
| JP | 2006-50662 | 2/2006 |
| JP | 2006-261788 | 9/2006 |
| JP | 2006-319501 | 11/2006 |
| JP | 2007-28429 | 2/2007 |
| JP | 2007-88721 | 4/2007 |
| JP | 2007-110501 | 4/2007 |
| WO | 96/13935 | 5/1996 |
| WO | 01/06788 | 1/2001 |

* cited by examiner

FIG. 5

| User | Installation region | Model type | Program providing company | Position |
|---|---|---|---|---|
| User A | The United States · Chicago (Central) | Company X: X-PVR01 | Company A | User |
| User B | The United States · San Francisco (Pacific) | Company Y: YVR-001 | Company B | Program list generator |
| User C | The United States · New York (East) | Company Y: YVR-002 | Company C | User |
| User D | The United States · New York (East) | Company Z: ZEP-01 | Company D | User |
| User E | The United States · New York (East) | Company Z: ZEP-02 | Company E | User |

FIG. 7

Program list generation/edit screen

Program list name: [JEANS activity list]    [Newly create]

List description: [Programs on which JEANS appear are completely covered.]

■ Registered program information    ■ Program information edit    [Update] [Add]

1. Acoustic live
2. JEANS close-up SP

| | |
|---|---|
| Title | Acoustic live |
| Date | 2004/10/11 |
| Start time | 23:00 |
| End time | 24:00 |
| Channel name | MMTV |
| Channel number | 1 |
| Category | Music |
| Keyword | JEANS Tom Mike David |
| Comment | Word has it JEANS will release a new song! |

[Newly register]

HOME
Program list generation
Program list search

FIG. 9

| Program information | |
|---|---|
| Title | Acoustic live |
| Date | 2004/10/11 |
| Start time | 23:00 |
| End time | 24:00 |
| Channel name | MMTV |
| Channel number | 1 |
| Category | Music |
| Keyword | JEANS Tom Mike David |
| Comment | Word has it JEANS will release a new song! |

FIG. 10

| Program list | | |
|---|---|---|
| Title | JEANS activity list | |
| Description | Programs on which JEANS appear are completely covered. | |
| Number of sets of program information | N | |
| Program information container | 1 | Program information 1 |
| | 2 | Program information 2 |
| | 3 | Program information 3 |
| | ... | ... |
| | N | Program information N |

FIG. 11

```
<programlist>
  <listdetail>
    <title> JEANS activity list </title>
    <description> Programs on which JEANS appear are completely covered. </description>
    <language> jp </language>
    <link> http://programlist.com/jp/uld_0123/plist.xml </link>
    <date> 2004-09-29T23:00:00 </date>
  </listdetail>
  <content type="application/x-program-info" >         } D11
    <title> Acoustic live </title>
    <date> 2004/10/11 </date>
    <start> 2004-10-11T23:00:00 </start>
    <end> 2004-10-11T24:00:00 </end>
    <channel_name> MMTV </channel_name>
    <channel_num> 1 </channel_num>
    <category> Music </category>
    <keyword> JEANS; Tom; Mike; David </keyword>
    <description> Word has it JEANS will release a new song! </description>
  </content>                                            } D12
  <content type="application/x-program-info" >
    <title> JEANS close-up SP </title>
    <date> 2004/12/01 </date>
    <start> 2004-12-01T21:00:00 </start>
    <end> 2004-12-01T23:00:00 </end>
    <channel_name> DTV </channel_name>
    <channel_num> 2 </channel_num>
    <category> Music </category>
    <keyword> JEANS; Tom; </keyword>
    <description> Enjoy the real face of JEANS' Tom </description>
  </content>                                            } D13
</programlist>
```

FIG. 14

Broadcast program information (2004/10/11 21:00-24:00)

| No. | CH. | Start time | End time | Title | Supplementary information |
|---|---|---|---|---|---|
| | | | | Program information | |
| 1 | 1 | 21:00 | 23:00 | All animals | Featuring amazing techniques of animals |
| 2 | 1 | 23:00 | 24:30 | Planet earth | Special "Mysterious Amazon" |
| 3 | 2 | 21:00 | 23:00 | Unplugged 2003 | Airing the entire recap of 2003 |
| 4 | 2 | 23:00 | 24:00 | Acoustic live | JEANS' STRING appears live |
| 5 | 3 | 21:00 | 23:00 | Movie "TOTORORO" | Re-air as encore |
| 6 | 3 | 23:00 | 25:30 | Movie "BIG WAVE" | Airing the U.S. No. 1 of the last year |
| N | x | ... | ... | ... | ... |

FIG. 15

| Broadcast program information (2004/10/11 21:00-24:00) |||||
|---|---|---|---|---|
| No. | CH. | Start time | End time | Program information ||
| | | | | Title | Supplementary information |
| 1 | 1 | 21:00 | 22:00 | Acoustic live | JEANS' STRING appears live |
| 2 | 1 | 22:00 | 24:00 | Cinematic review | New movie ranking, etc. |
| 3 | 2 | 21:00 | 22:30 | Planet earth | Special "Mysterious Amazon" |
| 4 | 2 | 22:30 | 24:00 | DTV NEWS CHANNEL | News of the day, etc. |
| 5 | 3 | 21:00 | 23:30 | Movie "BIG WAVE" | Airing the U.S. No. 1 of the last year |
| 6 | 3 | 23:30 | 24:00 | Drama Youth white paper | The 3rd episode The secret of Anna |
| N | x | ... | ... | ... | ... |

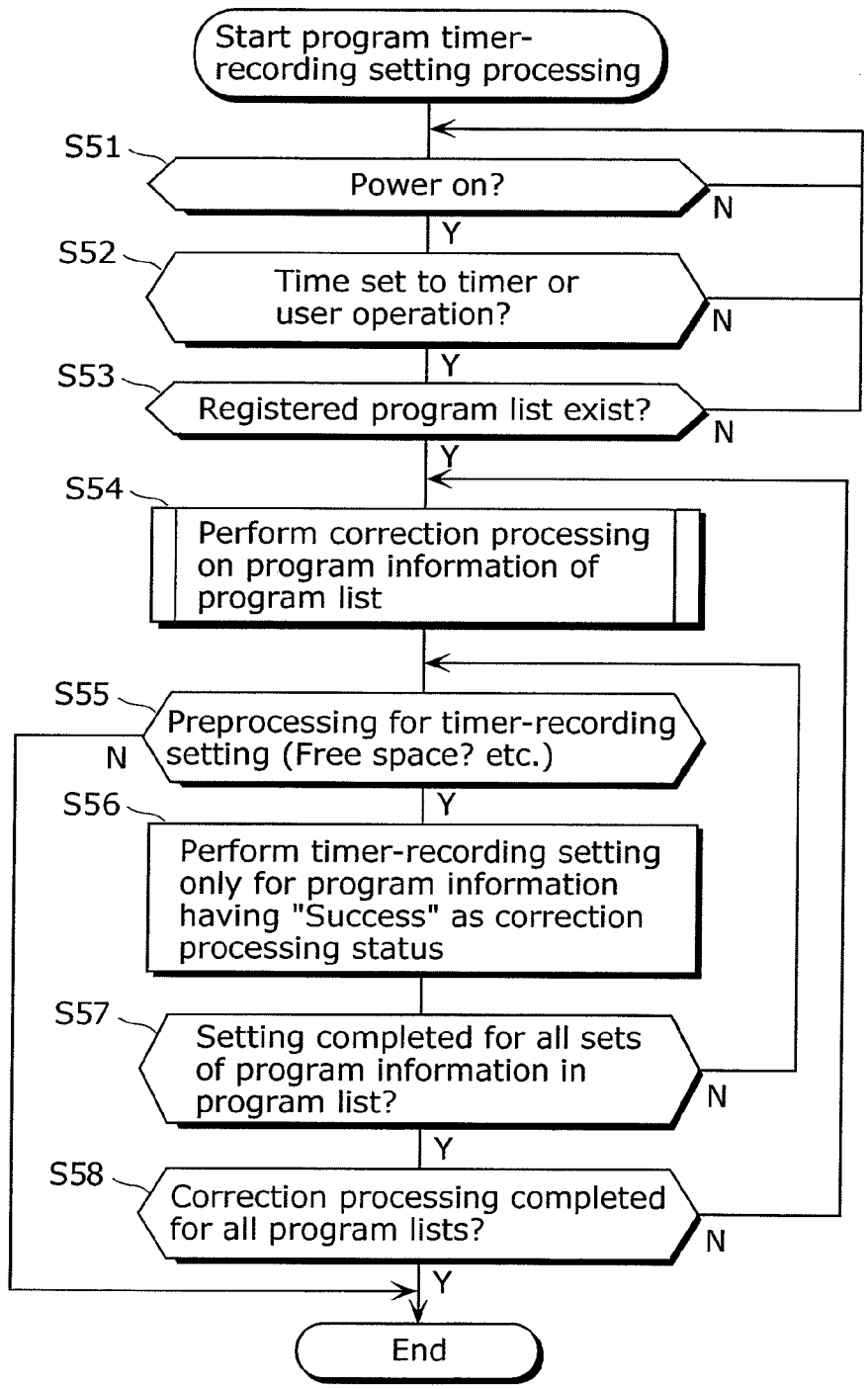

FIG. 17

| Program list | | | |
|---|---|---|---|
| No. | Program information | Correction flag | Status |
| 1 | Program information 1 | True | 200 |
| 2 | Program information 2 | True | 201 |
| 3 | Program information 3 | True | 404 |
|  |  |  |  |
| N | Program information N | False | Null |

FIG. 18

| Correction processing status | |
|---|---|
| Code | Meaning |
| 200 | Success (Local correction) |
| 201 | Success (Server correction) |
| 401 | Failure (Authentication error) |
| 404 | Failure (No correction candidate) |
| 500 | No correction (Not broadcast) |
| 501 | No correction (No capacity) |
| ... | ... |

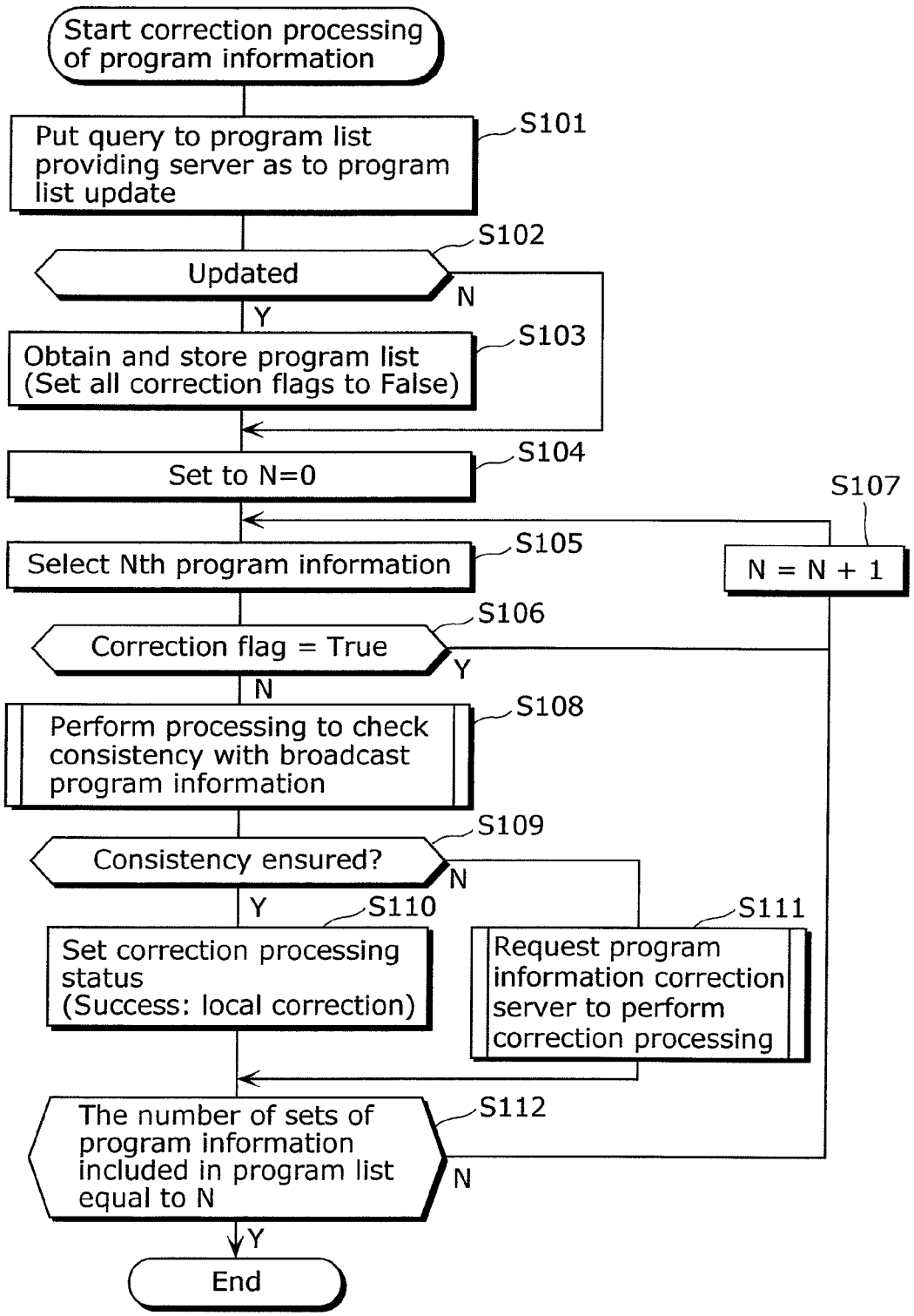

(a) Before correction   (b) After correction

FIG. 22

| Program information | |
|---|---|
| Title | MMTV A'Live |
| Date | 2004/10/12 |
| Start time | 21:00 |
| End time | 22:00 |
| Channel name | MMTV |
| Channel number | 1 |
| Category | Music |
| Keyword | JEANS Tom Mike David |
| Comment | Word has it JEANS will release a new song! |

FIG. 24

| Setting data | |
|---|---|
| Model type | X-PVR03 |
| Equipment manufacturer | Company X |
| Installation region | The United States・Chicago (Central) |
| Program providing company | Company A |
| Parental control | Available |
| Authorization for automatic recording of PPV | Unavailable |
| Time setting | GMT-6 |
| Daylight saving time setting | Unset |
| Language used | English |

FIG. 25

| Equipment manufacturer | Model type | Equipment capacity ||||||
|---|---|---|---|---|---|---|---|
| | | Hard disk capacity | Analogue terrestrial broadcasting | Digital terrestrial broadcasting | Satellite broadcasting | VDD reception | CATV reception |
| Company A | X-PVR01 | 500 | ○ | ○ | ○ | ○ | × |
| | X-PVR02 | 250 | ○ | ○ | ○ | × | × |
| | X-PVR03 | 250 | ○ | ○ | × | × | × |
| Company Y | YVR-001 | 1000 | ○ | ○ | ○ | ○ | ○ |
| | YVR-002 | 500 | ○ | ○ | × | × | × |
| | YVR-003 | — | × | × | × | × | ○ |
| Company Z | ZEP-01 | 500 | × | × | ○ | ○ | ○ |
| | ZEP-02 | 250 | × | × | × | ○ | ○ |
| | ZEP-03 | 250 | × | × | × | × | ○ |
| ... | | | | | | | |

FIG. 26

| Channel name-channel number conversion table | | | | | |
|---|---|---|---|---|---|
| Channel name | Program providing company | | | | |
| | Company A | Company B | Company C | Company D | Company E |
| MMTV | 2 | 1 | 5 | – | 1 |
| CXTV | 4 | – | 3 | 1 | 10 |
| DTV | 1 | 2 | 4 | – | 5 |
| ETV | 3 | 3 | 10 | 3 | – |
| FTV | – | – | 1 | 2 | 2 |
| ... | ... | ... | ... | ... | ... |

FIG. 27

(a) Standard time

| GMT | The United States | | | |
|---|---|---|---|---|
| | Pacific | Mountain | Central | East |
| 0 | -8 | -7 | -6 | -5 |

(b) Daylight saving time

| GMT | The United States | | | |
|---|---|---|---|---|
| | Pacific | Mountain | Central | East |
| 0 | -7 | -6 | -5 | -4 |

(From the first Sunday of April to the last Saturday of October)

TERMINAL DEVICE, INFORMATION CORRECTION SERVER, PROGRAM INFORMATION CORRECTION METHOD, AND INFORMATION CORRECTION METHOD

TECHNICAL FIELD

The present invention relates to program viewing and recording, and particularly relates to a terminal device which corrects program information included in a program list created by a third party according to a use environment of the terminal device and to a program viewing-recording system using a server that corrects the program information on the basis of the use environment of the terminal device.

BACKGROUND ART

In general, for viewing and timer-recording programs provided by a broadcast station or a cable television station, it is widely known that a user activates an electronic program guide (EPG: Electronic Program Guide) by operating a terminal device such as a television set or a recorder and then selects a desired program from among a plurality of displayed programs so as to view or timer-record the selected program. Also, systems whereby the user sends and receives specific messages by means of a cellular phone or a personal computer to carry out a remote recording from a remote location are coming into use. In either of these cases, the user finds the program which the user wishes to view or record, and executes an operation by sending instructions to the terminal device owned by the user.

On the other hand, another method has been suggested whereby preference information of a user owning a terminal device is collected based on an operation history of the terminal device, and telecast programs are automatically recorded using the program information registered by another user having the same preference (see Patent Reference 1, for example).

In the case of the above invention, a user 1 who uses a terminal device designates a user 2, by an identification, who is a third party. The preference information and registered program information of the designated user 2 are shared via a server connected to a network. Then, according to the preference information and the program information, telecast programs are automatically recorded.

Moreover, while the multi-channelization is being developed by program providing companies, such as broadcast stations and cable television stations, reediting and reorganizing an electronic program guide of each program providing company have become complicated. For example, local programs closely connecting with residential areas need to be inserted, and a broadcast time of a live sporting event needs to be corrected because of time-zone differences (mainly North America). Also, since the capability of displaying the electronic program guide is different for each terminal device that receives broadcasts from the program providing companies, fine adjustments are required, such as adjusting a text length to be displayed on the electronic program guide. To address these needs, systems have been suggested which determine errors in data of the electronic program guide in advance before the program providing company sends the data of the electronic program guide to terminal devices of general users (see Patent Reference 2, for example).

In the case of the above invention, program information which requires a fine adjustment in a to-be-displayed description is automatically extracted out of the data of the electronic program guide to be sent by the program providing company, according to the capability of a predetermined terminal device to display the electronic program guide. Then, the extracted result is shown on a screen of a dedicated terminal. Accordingly, those who are in charge of managing the data of the electronic program guide of the program providing company can make the fine adjustments to the program information by operating this dedicated terminal.

Patent Reference 1: Japanese Unexamined Patent Application Publication No. 2006-50662
Patent Reference 2: Japanese Patent Publication No. 2974784

DISCLOSURE OF INVENTION

Problems that Invention is to Solve

The invention according to the above Patent Reference 1 is based on the premise that the program information registered by the user 2, i.e., the third party, can be used as it is for the terminal device of the user 1. However, because of a time-zone difference between the living regions of the user 1 and the user 2 and a difference in channel assignments depending on the program providing companies subscribed to by the users, inconsistency is caused in the program information. As a result, there has been a problem that viewing and recording of programs would end in failure.

In the case of the invention according to the above Patent Reference 2, the fine adjustment required to be made to the program information out of the data of the electronic program guide to be sent by the program providing company is only presented according to the capability of the predetermined terminal device to display the electronic program guide. Thus, it has been a problem that a final judgment needs to be made by those who are in charge in the program providing company through operating the dedicated terminal. Moreover, the system disclosed in the above Patent Reference 2 is not designed with a program list created by a third party in mind. For this reason, it has been a problem that the program information cannot be corrected on the basis of: a model type of the individual terminal device used by the user; a region where the terminal device is installed; a program providing company subscribed to by the user; subscription details; and a detailed user setting.

The present invention is conceived in order to solve the stated problems, and a first object of the present invention is to provide a program viewing-recording system whereby when programs provided by a plurality of program providing sources are managed in chronological order based on providing dates, providing start times, and providing end times of the programs and the programs are to be viewed and recorded, a program list created by a user that includes a program relating to a specific category or a specific topic is shared via a server so that a third party can easily use this program list in program viewing and program timer-recording.

Moreover, a second object of the present invention is to provide a terminal device and a program information correction system whereby, when program viewing or program timer-recording setting is carried out using the program list created by the third party, the program information included in the program list created by the third party is corrected according to a use environment of the terminal device.

Means to Solve the Problems

According to an aspect of the present invention, there is provided a terminal device which includes: a communication unit that sends and receives data to and from an external server connected to a network; a receiving unit that receives video forming a program and broadcast program information; a broadcast program information management unit that manages the broadcast program information obtained from the receiving unit; a program list management unit that manages a program list obtained from the external server and program information included in the program list; a terminal setting management unit that manages setting data of the terminal device; a program information adjustment unit that corrects at least one set of program information included in the program list on the basis of the setting data; and an output unit that provides the program information corrected by the program information adjustment unit.

The program information adjustment unit of the terminal device according to the aspect of the present invention may request, via the communication unit, the external server connected to the network to perform correction processing on the at least one set of program information included in the program list.

The program information adjustment unit of the terminal device according to the aspect of the present invention may compare the at least one set of program information included in the program list with the broadcast program information, and correct a detail of the program information on the basis of the setting data.

The program information managed by the terminal device according to the aspect of the present invention may include at least one of a title, a date, a start time, an end time, a channel name, providing-source identification information, program identification information, a channel number, a category, a subcategory, a brief description, appearing guest information, related-program information, a keyword given by a providing source, a keyword given by a third party, a comment made by the providing source, a comment made by a third party, age-limit information, and a viewing expiration date.

The program information managed by the terminal device according to the aspect of the present invention may include information, other than video content received by the receiving unit, that identifies a location of content distributed via the network.

The setting data of the terminal device according to the aspect of the present invention may include at least one of: a model type identifying a time of manufacture and a capacity of the terminal device; an equipment manufacturer which manufactured the terminal device; an installation region indicating a region where the terminal device is installed; providing-source identification information identifying a program providing source from which the terminal device can receive data; a parental control setting of the terminal device; a recording authorization setting of the terminal device for an automatic recording of a pay-per-view program; a time setting of the terminal device; a daylight saving time setting of the terminal device; a language setting of the terminal device; and a keyword set by a user of the terminal device to indicate an interest and a taste.

The detail to be corrected by the terminal device according to the aspect of the present invention may include at least one of: a difference due to a time-zone difference; a difference due to a daylight saving time setting; a difference in a descriptive manner due to one of an entry error and a difference in expression made by a third party when the third party creates the program list; a difference due to a different subscription; a difference due to a different processing capacity of the terminal device; a difference due to a different setting of the terminal device; and a difference between the program information at the present moment and one of information obtained when the program list was created and information obtained when the program information was created.

The program list management unit of the terminal device according to the aspect of the present invention may hold the setting data added to the program list obtained from the external device via the communication unit, in association with the program information included in the program list.

When determining, as a result of correcting the program information on the basis of the setting data, that it is impossible to view or record the program using the program information, the program information adjustment unit of the terminal device according to the aspect of the present invention may assign an information flag indicating that the program information cannot be used, so that the program is not to be viewed or recorded.

According to another aspect of the present invention, there is provided a first information correction server which includes: a communication unit that receives setting data and a correction request including at least one set of correction-target information, from a terminal device connected to a network; a parent information database that accumulates at least one set of parent information that is to be a correction source; an equipment information management unit that manages equipment information relating to at least one piece of equipment and determines whether or not equipment information that agrees with the setting data received from the terminal device exists; and an information correction control unit that, when the equipment information management unit determines that appropriate equipment information exists, searches the parent information database for the parent information that is the correction source for the correction-target information, on the basis of the appropriate equipment information, compares the extracted parent information with the correction-target information, and makes a correction by overwriting a detail of the correction-target information that is different from a detail of the parent information with the detail of the parent information, wherein the overwritten correction-target information is sent, via the communication unit, to the terminal device which is a source of the request.

According to yet another aspect of the present invention, there is provided a second information correction server which includes: a communication unit that communicates with a terminal device and a parent information providing server both connected to a network and receives setting data and a correction request including at least one set of correction-target information from the terminal device; an equipment information management unit that manages equipment information relating to at least one piece of equipment and determines whether or not equipment information that agrees with the setting data received from the terminal device exists; and an information correction control unit that, when the equipment information management unit determines that appropriate equipment information exists, generates a search query on the basis of the appropriate equipment information in order to obtain parent information that is a correction source for the correction-target information, compares the parent information extracted as a result of the search query sent to the parent information providing server with the correction-target information, and makes a correction by overwriting a detail of the correction-target information that is different from a detail of the parent information with the detail of the parent information, wherein the overwritten correction-target information is sent, via the communication unit, to the terminal device which is a source of the request.

Each of the correction-target information and the parent information managed by the first information correction server and the second information correction server according to the above aspects of the present invention may include at least one of a title, a date, a start time, an end time, a channel name, providing-source identification information, program identification information, a channel number, a category, a subcategory, a brief description, appearing guest information, related-program information, a keyword given by a providing source, a keyword given by a third party, a comment made by the providing source, a comment made by a third party, age-limit information, and a viewing expiration date.

Each of the correction-target information and the parent information managed by the first information correction server and the second information correction server according to the above aspects of the present invention may include information, other than video content received by the receiving unit, that identifies a location of content distributed via the network.

The setting data for each of the correction-target information and the parent information managed by the first information correction server and the second information correction server according to the above aspects of the present invention may include at least one of: a model type identifying a time of manufacture and a capacity of the terminal device; an equipment manufacturer which manufactured the terminal device; an installation region indicating a region where the terminal device is installed; providing-source identification information identifying a program providing source from which the terminal device can receive data; a parental control setting of the terminal device; a recording authorization setting of the terminal device for an automatic recording of a pay-per-view program; a time setting of the terminal device; a daylight saving time setting of the terminal device; a language setting of the terminal device; and a keyword set by a user of the terminal device to indicate an interest and a taste.

The details to be corrected respectively by the first information correction server and the second information correction server according to the above aspects of the present invention may include at least one of: a difference due to a time-zone difference; a difference due to a daylight saving time setting; a difference in a descriptive manner due to one of an entry error and a difference in expression made by a third party when the third party creates the program list; a difference due to a different subscription; a difference due to a different processing capacity of the terminal device; a difference due to a different setting of the terminal device; and a difference between the program information at the present moment and one of information obtained when the program list was created and information obtained when the program information was created.

According to yet another aspect of the present invention, there is provided a program information correction method which includes: sending and receiving data to and from an external server connected to a network; receiving video forming a program and broadcast program information; managing the received broadcast program information; managing a program list obtained from the external server and program information included in the program list; managing setting data of a terminal; comparing at least one set of program information included in the program list with the broadcast program information and correcting a detail of the program information on the basis of the setting data; and providing the corrected program information.

According to yet another aspect of the present invention, there is provided a first program information correction method which includes: sending and receiving data to and from a terminal device connected to a network; managing equipment information relating to at least one piece of equipment; accumulating at least one set of parent information which is to be a correction source; receiving setting data and at least one set of correction-target information from the terminal device, making a query as to whether or not equipment information which agrees with the setting data received from the terminal device exists, searching for, when appropriate equipment information is determined to exist, the parent information which is the correction source for the correction-target information, on the basis of the appropriate equipment information, comparing the extracted parent information with the correction-target information, and making a correction by overwriting a detail of the correction-target information that is different from a detail of the parent information with the detail of the parent information.

According to yet another aspect of the present invention, there is provided a second program information correction method which includes: communicating with a terminal device and a parent information providing server both connected to a network and receiving setting data and a correction request including at least one set of correction-target information from the terminal device; managing equipment information relating to at least one piece of equipment and determining whether or not equipment information which agrees with the setting data received from the terminal device exists; and generating, when appropriate equipment information is determined to exist, a search query on the basis of the appropriate equipment information in order to obtain parent information which is a correction source for the correction-target information, comparing the parent information extracted as a result of the search query sent to the parent information providing server with the correction-target information, and making a correction by overwriting a detail of the correction-target information that is different from a detail of the parent information with the detail of the parent information.

Effects of the Invention

The present invention allows a program list created by a user that includes a program relating to a specific category or a specific topic to be shared via a server and also allows a third party to easily use the program list in program viewing and program timer-recording. Moreover, the terminal device of the present invention corrects program information included in the program list created by the third party, according to a use environment of the present terminal device. Thus, a failure in program viewing or program timer-recording which may be caused due to the inconsistency in the program information can be prevented from occurring, so that the program can be properly viewed or timer-recorded with reliability.

BRIEF DESCRIPTION OF DRAWINGS

FIG. 5 is a diagram showing a case example of a situation where users use the program recording devices.

FIG. 7 is a diagram showing an example of a screen when a program list is generated.

FIG. 9 is a diagram showing an example of program information created by a user B.

FIG. 10 is a diagram showing an example of a program list.

FIG. 11 is a diagram showing an example of a data structure of the program list.

FIG. 14 is a diagram showing an example of broadcast program information of a program providing company (a company A).

FIG. 15 is a diagram showing an example of broadcast program information of a program providing company (a company B).

FIG. 16 is a flowchart showing program timer-recording setting processing performed by the program recording device shown in FIG. 1.

FIG. 17 is a diagram showing an example of additional information in the case where the program recording device shown in FIG. 1 internally holds the program list.

FIG. 18 is a diagram showing an example of correction processing statuses which the program recording device shown in FIG. 1 internally manages.

FIG. 19 is a flowchart showing program information correction processing performed by the program recording device shown in FIG. 1.

FIG. 22 is a diagram showing an example different from the program information created by the user B that is shown in FIG. 9.

FIG. 24 is a diagram showing an example of setting data.

FIG. 25 is a diagram showing an example of an equipment information database (DB).

FIG. 26 is a diagram showing an example of a channel number conversion table based on program providing sources, that is held by the program information correction server shown in FIG. 1.

FIG. 27 (a) and (b) are diagrams showing examples of a time-zone difference lookup table that shows relations between regions where the program recording device of FIG. 1 is installed and time-zone differences.

Figure 1:
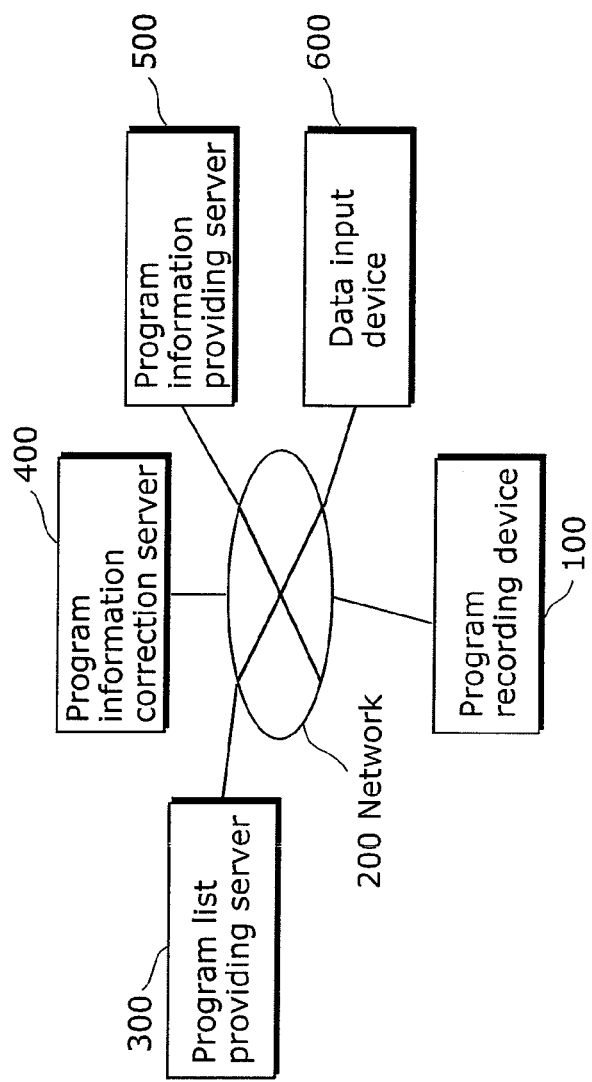
FIG. 1 is a diagram showing a configuration of a program recording system according to a first embodiment of the present invention.

NUMERICAL REFERENCES 100 program recording device
101 input unit
102 terminal operation control unit
103 receiving unit
104 recording control unit
105 accumulation unit
106 broadcast program information management unit
107 application
108, 301, 401, 501 communication unit
109 program list management unit
110 program information adjustment unit
111 terminal setting management unit
112 setting data
113 output unit
200 network
300 program list providing server
302 operation screen providing unit
303 program list management unit
304 program list database
305 program list search unit
306 user information management unit
307 user information database
308 program information adjustment unit
400 program information correction server
402 equipment information management unit
403 equipment information database
404 program information correction control unit
500 program information providing server
502 program information management unit
503 program information database
504 program information search control unit
600 data input device
700 program providing device

BEST MODE FOR CARRYING OUT THE INVENTION

The following is a detailed description of embodiments of the present invention, with reference to the drawings.

First Embodiment

FIG. 1 is a diagram showing a configuration of a program recording system according to the first embodiment of the present invention.

In FIG. 1, a program recording device 100 can receive and record video, audio, and data provided by a broadcast station, a cable television station, or the like over airwaves or a dedicated cable or over a network typified by the Internet. The program recording device 100 is connected to a network 200 typified by the Internet, and can communicate with servers connected to the network 200.

A program list providing server 300, a program information correction server 400, a program information providing server 500, and a data input device 600 are connected to the network 200. The program list providing server 300 can hold at least one program list in which at least one set of program information can be described, and can send the program list in response to a request from a terminal device such as the program recording device 100. Moreover, the program list providing server 300 can newly create a program list and can add and edit the program information, in response to an operating instruction from, for example, a personal computer, a cellular phone called a smart phone, and the data input device 600 which is like a high-performance television connected to the network 200.

The program information correction server 400 can correct an incorrect description in the received program information and send the information back, in response to a request from the program recording device 100 or the program list providing server 300. In order to execute the stated correction processing, the program information correction server 400 can request the program information providing server 500 to transmit the program information and can receive the return program information.

The program information providing server 500 holds at least one set of broadcast program information which completely covers basic information about programs to be broadcast by a broadcast station or a cable television station during a predetermined period of time (one month, for example). The basic information of each program includes a title, a date, a broadcast start time, a broadcast end time, a brief description of the program, a channel number, and a category. Moreover, the program information providing server 500 can send the appropriate program information in response to a request from the program list providing server 300 or the program information correction server 400 both connected to the network 200.

Figure 2:
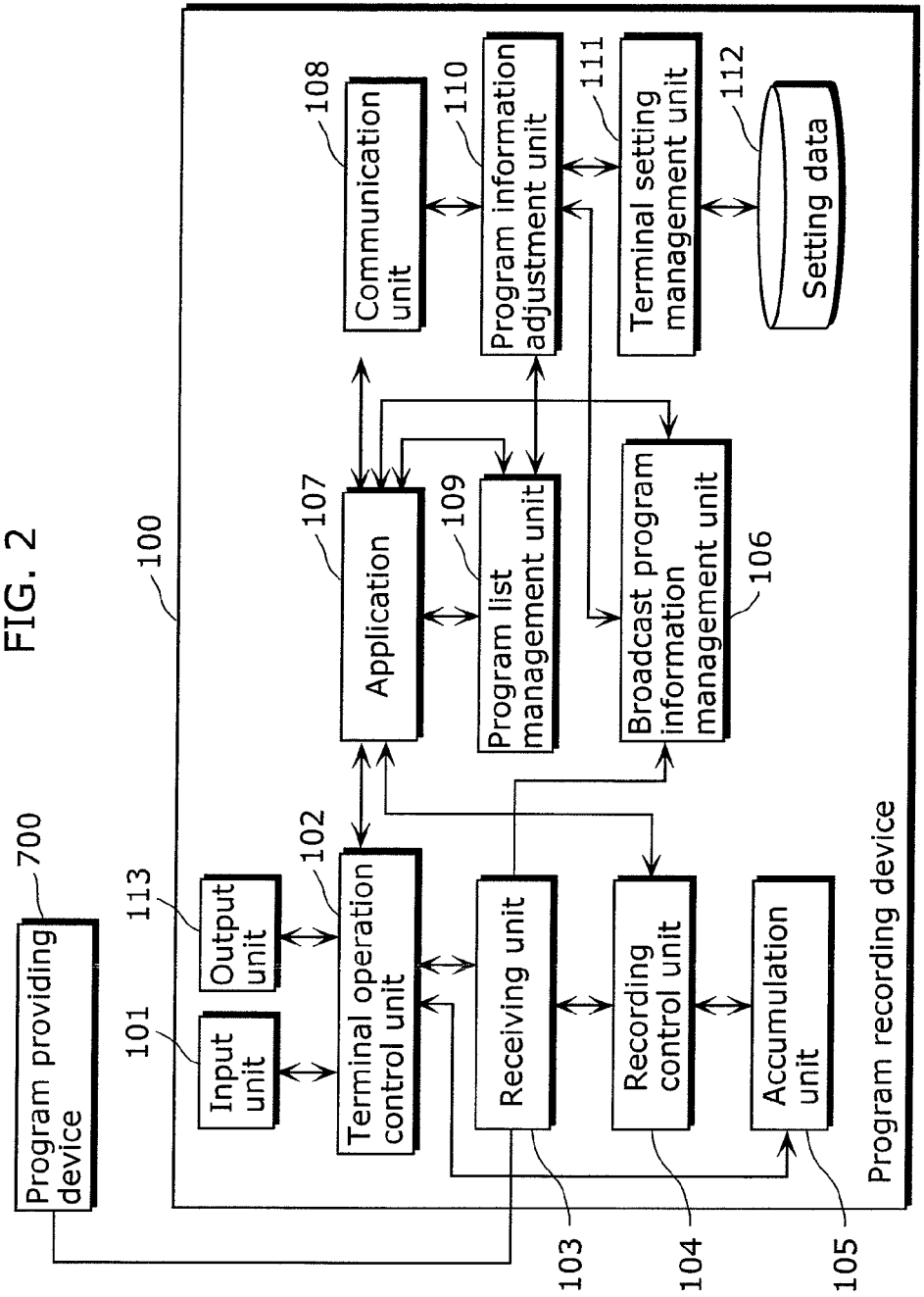
FIG. 2 is a block diagram showing an internal configuration of a program recording device shown in FIG. 1.

FIG. 2 is a block diagram showing an internal configuration of the program recording device 100 in FIG. 1.

An input unit 101 included in the program recording device 100 receives a user operation performed by means of buttons attached to a device cabinet or a user operation performed by means of buttons attached to a remote controller device which is not shown. Then, the input unit 101 enters a signal of the received user operation to a terminal operation control unit 102.

The terminal operation control unit 102 performs entire control of functional operations, such as power-supply control of the program recording device 100, content selection control, viewing control, timer-recording setting control, recording control, and setting change control.

A receiving unit 103 receives broadcast data sent from a program providing device 700 via a not-shown external input interface of the program recording device 100. The receiving unit 103 decodes video which is to be a broadcast program, and sends the decoded video data to: an output unit 113 via the terminal operation control unit 102 in the case of program viewing; and a recording control unit 104 in the case of program recording. Also, the receiving unit 103 sends electronic program guide information (EPG information) included in the received broadcast data to a broadcast program information management unit 106 as necessary.

The recording control unit 104 encodes the video received from the receiving unit 103 according to an instruction from an application 107 (a program timer-recording setting application in this case here), and sends the encoded video to an accumulation unit 105 to record the program.

The accumulation unit 105 accumulates the data (the video signal) received from the recording control unit 104 in rewritable storage, for example (a nonvolatile recording medium, such as a hard disc, an optical disc drive, or a flash memory). The accumulation unit 105 manages the data in such a manner that the data can be played back in response to a request from the terminal operation control unit 102.

The broadcast program information management unit 106 returns the electronic program information received from the receiving unit 103, in response to a request from the application 107 (an electronic program guide display application in this case here) or a program information adjustment unit 110. It should be noted here that two ways can be considered in receiving the electronic program information from the receiving unit 103. One way is that the electronic program information is obtained at regular time intervals and held in a data accumulation area managed by the broadcast program information management unit 106, so as to be used as needed. The other way is that the electronic program information is sent from the program providing device 700 at all times and the information is sequentially received in real-time processing when necessary. It is desirable that the latter be installed since the latter is superior in update-following capability as compared with the former.

The application 107 includes functions which are activated on the basis of the user operation received from the input unit 101. The functions includes: a program timer-recording setting application, an electronic program guide display application, a browser application allowing access to a content providing server which is not shown but connected to the network 200 and allowing browsing Web pages, and a calendar display application. Using the electronic program guide display function, for example, the application 107 sequentially requests the broadcast program information management unit 106 to provide the broadcast program information. Then, a screen simple to understand for the user is generated and sent to the output unit 113. Since this application 107 is an abstract representation of a plurality of functions installed in the program recording device 100, each of the following cases is explained by changing the function as appropriate. In the first embodiment, the program timer-recording setting application is mainly explained. It should be noted that the application 107 may have all the functions including the stated program timer-recording setting application and the stated electronic program guide display application, or may have a combination of predetermined two or more functions.

The application 107 is activated on the basis of the user operation received from the input unit 101, and requests the broadcast program information management unit 106 to provide the program information. Based on the return program information, the timer-recording setting processing is executed. Moreover, the application 107 internally manages a timer-recording setting list which is not shown. At a time when preparation for the recording processing needs to be made, the application 107 gives a control instruction for the recording processing to the recording control unit 104 after performing adjustment processing with the terminal operation control unit 102.

Furthermore, the application 107 can: communicate with the program list providing server connected to the network 200 via a communication unit 108; search and find a program list created by a third party; download the program list selected by the user; and request a program list management unit 109 to register and store the program list.

The communication unit 108 receives a message sent from the application 107 or the program information adjustment unit 110, sends the message to the server connected to the network 200, and transfers the received response message to the units.

In response to the request from the application 107, the program list management unit 109 stores the received program list. Moreover, the program list management unit 109 returns the program list and the program information in response to a request from the program information adjustment unit 110.

The program information adjustment unit 110 obtains the program information from the program list management unit 109, and attempts to correct the program information created by the third party by comparison with the broadcast program information obtained from the broadcast program information management unit 106. When inconsistency found by comparison with the broadcast program information cannot be solved, the program information adjustment unit 110 sends the program information together with setting data 112 obtained from a terminal setting management unit 111 and requests, via the communication unit 108, the program information correction server 400 connected to the network 200 to correct the program information. Then, the corrected program information is returned to the program list management unit 109 and is used by the application 107 for the program recording processing. Note that the setting data 112 held by the terminal setting management unit 111 is a collection of various sets of information set by the user who uses the program recording device 100. The various sets of information will be explained later.

Figure 3:
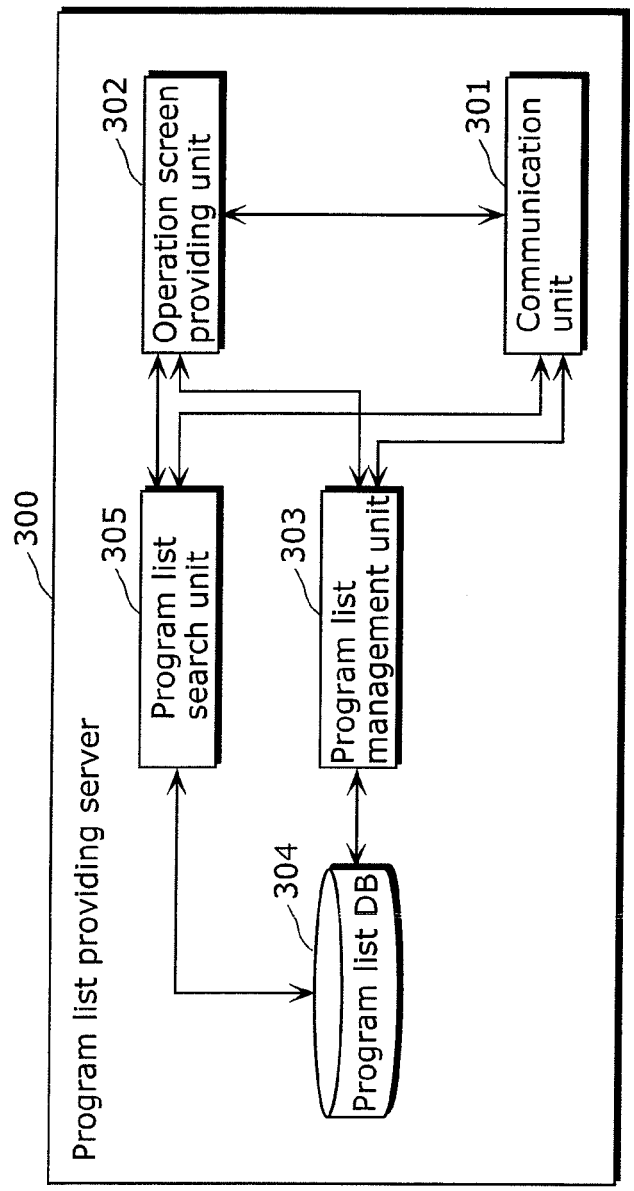
FIG. 3 is a block diagram showing an internal configuration of a program list providing server shown in FIG. 1.

FIG. 3 is a block diagram showing an internal configuration of the program list providing server 300 of FIG. 1.

A communication unit 301 receives a message from the program recording device 100 connected to the network 200, and transfers the message to an operation screen providing unit 302 or a program list management unit 303. Then, the communication unit 301 receives a response message created by the operation screen providing unit 302 or the program list management unit 303, and sends the response message to the program recording device 100.

The operation screen providing unit 302 analyzes the message received from the communication unit 301, generates a response message including a screen element based on the request from the program recording device 100, and sends the response message to the program recording device 100 via the communication unit 301. Here, the operation screen providing unit 302 puts a query to the program list management unit 303 as needed in order to obtain the program list data. Moreover, when a request for a program list search is included in the message received from the program recording device 100, the operation screen providing unit 302 requests a program list search unit 305 to search for the program list and then reflects the search result as a screen element.

The program list management unit 303 manages a program list DB (database) 304, and provides the program list data including the program information on the basis of the request from the operation screen providing unit 302. Note that the program list DB 304 is accumulated in rewritable storage (a nonvolatile recording medium, such as a hard disc, an optical disc drive, or a flash memory) of the program list providing server. Also note that database of a predetermined period of time (database of one week, for example) can be held as a backup in different storage.

In response to the request from the operation screen providing unit 302, the program list search unit 305 accesses the program list DB 304. After searching the program list DB 304 for the program list including a given keyword using a publicly-known search means, the program list search unit 305 returns the obtained search result to the operation screen providing unit 302.

Figure 4:
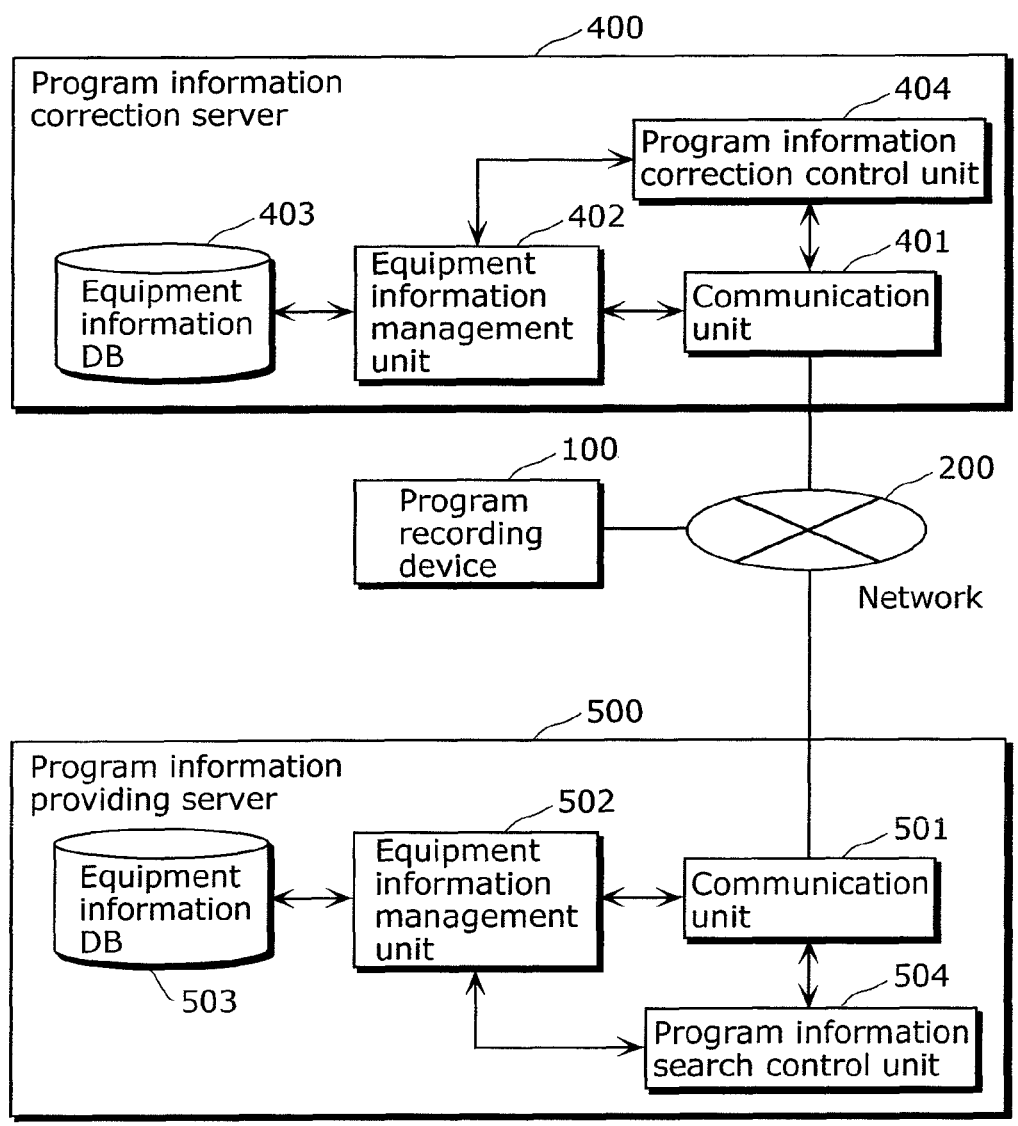
FIG. 4 is a block diagram showing internal configurations of a program information correction server and a program information providing server.

FIG. 4 is a block diagram showing internal configurations of the program information correction server 400 and the program information providing server 500.

First, the internal configuration of the program information correction server 400 is explained. A communication unit 401 receives a message from the program recording device 100 connected to the network 200 and transfers the message to a program information correction control unit 404. Then, the communication unit 401 receives a response message created by the program information correction control unit 404 and sends the response message to the program recording device 100.

An equipment information management unit 402 manages an equipment information DB (database) 403, and returns equipment capacity data, which differs according to the model of the program recording device 100, on the base of a request from the program information correction control unit 404. Note that the program list DB 403 is accumulated in rewritable storage (a nonvolatile recording medium, such as a hard disc, an optical disc drive, or a flash memory) of the program information correction server. Also note that database of a predetermined period of time (database of one week, for example) can be held as a backup in different storage.

The program information correction control unit 404 analyzes the message received from the communication unit 401 and corrects the data included in the program information in response to a request from the program recording device 100. The program information correction control unit 404 generates a response message including the corrected program information and sends the response message to the program recording device 100 via the communication unit 401. Here, the program information correction control unit 404 puts a query to the equipment information management unit 402 or the program information providing server 500 which is connected to the network 200 as needed in order to obtain the equipment capacity data or the latest program information which has abundant and correct descriptive content.

Next, the internal configuration of the program information providing server 500 is explained. A communication unit 501 receives a message from the program information correction server 400 connected to the network 200, and transfers the message to a program information search control unit 504. Then, the communication unit 501 also receives a response message created by the program information search control unit 504, and sends the response message to the program information correction server 400.

A program information management unit 502 manages a program information database (program information DB)

503, and provides a desired latest program information which has abundant and correct description, on the basis of a request from the program information search control unit 504. Also, the program information management unit 502 internally has a timer which is not shown. At regular time intervals under the control of the timer, the program information management unit 502 can obtain the latest program information which has abundant and correct descriptive content provided by the broadcast station or cable television station via a server which is not shown but connected to the network 200. Then, the program information management unit 502 can update the program information of the program information DB 503. Note that the program list DB 503 is accumulated in rewritable storage (a nonvolatile recording medium, such as a hard disc, an optical disc drive, or a flash memory) of the program information providing server. Also note that database of a predetermined period of time (database of one week, for example) can be held as a backup in different storage.

The explanation has been given based on that the program information to be provided is accumulated in the program information database. Note that, however, in response to a request from the program information correction server 400, other servers providing the program information may be searched across and the program information collected in real time may be provided.

The program information search control unit 504 analyzes the message received from the communication unit 501. In response to a request from the program information correction server 400, the program information search control unit 504 generates a response message including the desired latest program information which has abundant and correct descriptive content, and then sends the response message to the program information correction server 400 via the communication unit 501. Here, the program information search control unit 504 puts a query to the program information management unit 502 as needed in order to obtain the program information.

With reference to FIGS. 5 to 11, an explanation is given about processing performed by a user, who is a third party, to generate program information and a program list.

Figure 6:
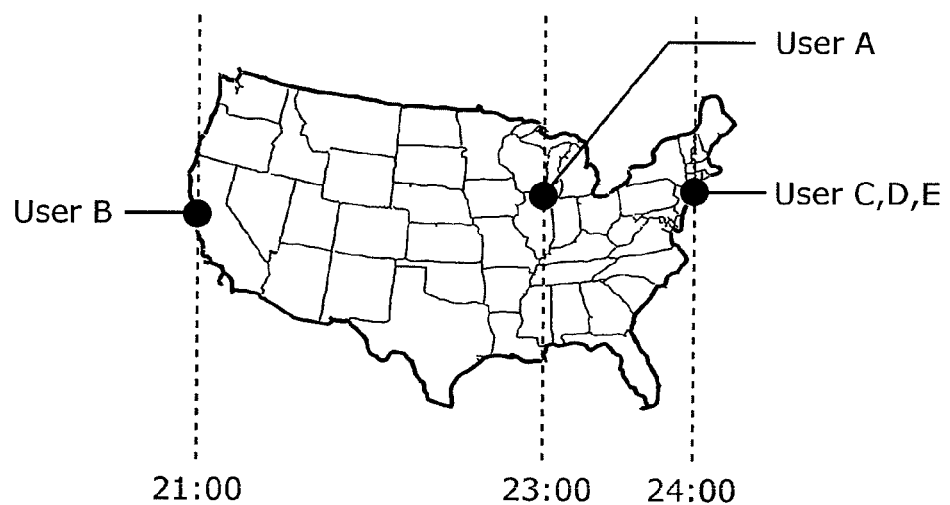
FIG. 6 is a diagram explaining the case shown in FIG. 5, using a map of North America and time-zone differences among the users.

FIG. 5 is a diagram showing a case example of a situation where the users use the program recording devices. FIG. 6 is a diagram explaining the case of FIG. 5, using a map of North America and time-zone differences among the users. In the embodiment of the present invention to be explained, suppose a case where five users A to E are living in different regions in different time zones, each having a different model type of the program recording device 100, and settings of broadcast stations to be received and a cable television station subscribed to are different for each user. Note that the situation described in the present specification is an assumption and, therefore, it does not matter when: the users are living in different countries other than the United States; the users have the same type of device; and the same broadcast stations are set to be received or the same cable television station is subscribed to.

As shown in FIGS. 5 and 6, a user A is living in Chicago located in the central United States, a user B is living in San Francisco located in the Pacific region of the United States, and users C to E are living in New York located in the eastern United States. The distances among these regions cause time-zone differences. For example, when it is 21:00 in the region of the user B, it is 23:00 in the region of the user A and 24:00 in the region of the user C to E. With consideration given to the time-zone differences, each broadcast station or each cable television station schedules the broadcast programs for each region. Meanwhile, generally speaking, few users consciously think about what time the broadcast programs are to be aired in different regions while conducting normal lives in their own living regions. This is to say, based on service the users can enjoy in their own living regions, the users seem to think about things with the conception of their living hours in their own living regions.

Figure 8:
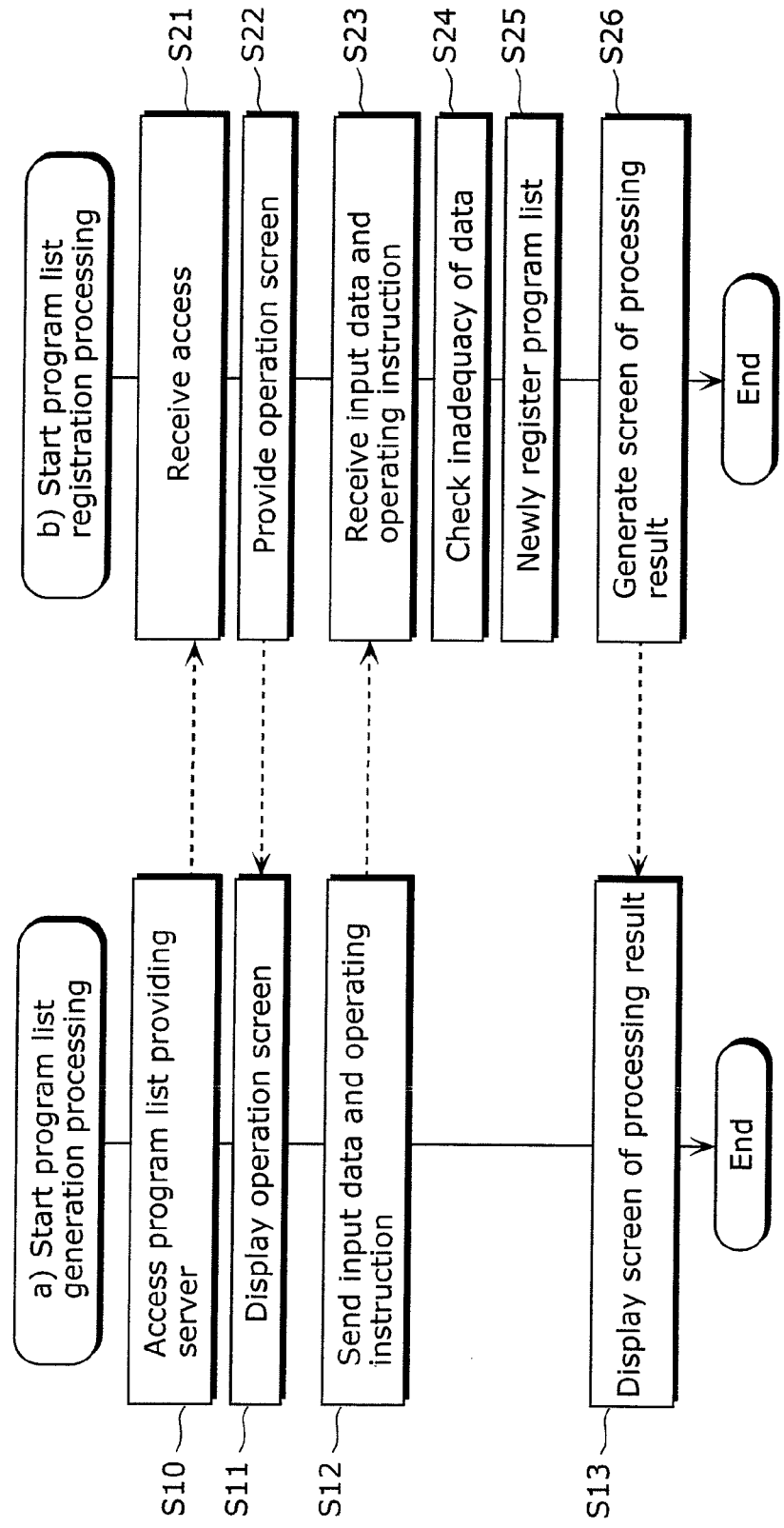
FIG. 8 is a diagram showing flowcharts of program list generation processing performed by a data input device and the program list providing server shown in FIG. 1.

Here, an explanation is given about a procedure in a case where the user B living in the Pacific region of the United States generates a program list, with reference to FIGS. 7 and 8. FIG. 7 is a diagram showing an example of a screen when the program list is generated. FIG. 8 is a diagram showing flowcharts of program list generation processing performed by the data input device 600 and the program list providing server 300 shown in FIG. 1. FIG. 8 a) shows processing performed by the data input device 600 and FIG. 8 b) shows processing performed by the program list providing server 300.

The user B can access the program list providing server 300 connected to the network 200, using a home personal computer as the data input device 600 shown in FIG. 1 (S10). In this case here, suppose that the network 200 is the Internet available at home. However, a private communication network which is not open to the public may be used.

The program list providing server 300 receives access from the data input device 600 (S21), creates a screen element generated by the operation screen providing unit 302 as a return message, and then sends the return message to the data input device 600 (S22). The data input device 600 displays the screen based on the received screen element (S11). By entering a list title of the program list that the user B wishes to create and a list description regarding a list creation policy through a common browser operation, the user B can newly create the program list by means of a "newly create" button.

Next, the user B can enter the program information (including a title of a program, a broadcast date, a broadcast start time, a broadcast end time, a channel number, a category, a keyword, and a comment from the user) of the program that the user B wishes to recommend a third party to view or record, using the data input device 600 (FIG. 7). Moreover, the user B can add the program information one by one using an "add" button, and thus at least one set of program information can be written in one program list. Furthermore, by selecting a desired set of program information from a table of "Registered program information", the user B can browse and reedit the entered information of the corresponding program information, and can overwrite and save the information by means of an "update" button (S12).

Next, when finishing the entry operation for the program list, the user B can request that the created program list be newly registered in the program list DB 304 of the program list providing server 300 by pressing a "newly register" button arranged on the screen (S12).

The program list management unit 303 of the program list providing server 300 checks inadequacies of the received data (including detecting dropouts of required items and invalid character strings which cannot be registered) in response to a request from the operation screen providing unit 302 (S23 and S24). When the received data has no inadequacies, the program list management unit 303 newly registers the program list including the program information to the program list DB 304 (S25).

After this, the operation screen providing unit 302 generates a screen showing the processing result and sends this generated screen to the data input device 600 (S26). The data input device 600 displays the processing result, and the processing of newly creating the program list is terminated (S13). It should be noted that when a program list is newly created, the program list management unit 303 of the program list providing server 300 adds a URL (Uniform Resource Locator), as a public path, which can specify the present program list on the network 200.

In this case here, the program list providing server displays the provided screen element using the browser installed in the personal computer, as an example. However, a program list management application which has been downloaded to the personal computer and has been activated may newly create the program list online with the program list providing server. Moreover, the data input device 600 is not limited to a personal computer, and may be a cellular phone called a smart phone or a high-performance television connected to the network 200. In such a case, it is desirable that the screen element provided by the program list proving server 300 be changed according to the display capacity of the data input device 600. Also, when the data input device 600 can locally generate the program information list and upload the generated program information list to the program list providing server 300, the program list providing server 300 may not need to provide the operation screen to the data input device 600.

Furthermore, the data to be obtained as the screen element may be: a document based on a markup language like HTML which can be browsed by a general browser; a plain text document; or data in binary format uniquely defined for each manufacturer.

FIG. 9 is a diagram showing an example of the program information created by the user B. The program list includes a title, a broadcast date, a start time, an end time, a channel name, a channel number, a category, a keyword, and a comment. It should be noted that the items shown here merely correspond to the items which can be entered on the screen shown in FIG. 7 and, thus, the corresponding items are not limited to these examples. For example, the items can be increased so as to describe a series number of drama series or a URL that allows a link to the official website of the program.

FIG. 10 is a diagram showing an example of the program list. Each program list includes a list title, a list description regarding a list creation policy, the number of sets of program information accommodated, and a program information container which can accommodate at least one set of program information. It should be noted that the items shown here merely correspond to the items which can be entered on the screen shown in FIG. 7 and, thus, the corresponding items are not limited to these examples. For example, the items can be increased so as to describe user profile information such as a nickname and an age of the creator of the program list, a category of the program list, an expiration date of the program list, and the like.

FIG. 11 is a diagram showing an example of a data structure of the program list. This example shows, in the XML format which is one of the markup languages, that two sets of program information are included in one program list. A "programlist" tag shows that the contained data is a program list. A "listdetail" tag described in a nesting manner shows that the contained data is supplementary information relating to the program list. A "title" tag shows a title of the program list; a "description" tag shows a brief description of the program list; a "language" tag shows a classification of the description language; a "link" tag shows a public path of the program list; a "date" tag shows a date and time when the program list was updated (D11). Moreover, a "content" tag which is also described in a nesting manner shows that the contained data is information relating to the program information; a "title" tag shows a title of the program; a "date" tag shows a broadcast date; a "start" tag shows a start time; an "end" tag shows an end time; a "channel_name" tag shows a channel name; a "channel_num" tag shows a channel number; a "category" tag shows a category; a "keyword" tag shows keywords; and a "description" tag shows a comment (D12 and D13). It should be noted that although the present example shows a case where unique identification tags are used in the XML format, the format to express the program list and the program information is not limited to the present example. For instance, a plain text document or a binary data format uniquely defined for each manufacturer may be used.

Accordingly, the user B can generate the program list and the program information using the data input device 600 through the processing of S10 to S26 explained with reference to FIGS. 7 to 11. The user B is considered to be a third party by other users. Moreover, the generated program list and the generated program information are registered in the program list providing server 300.

Figure 12:
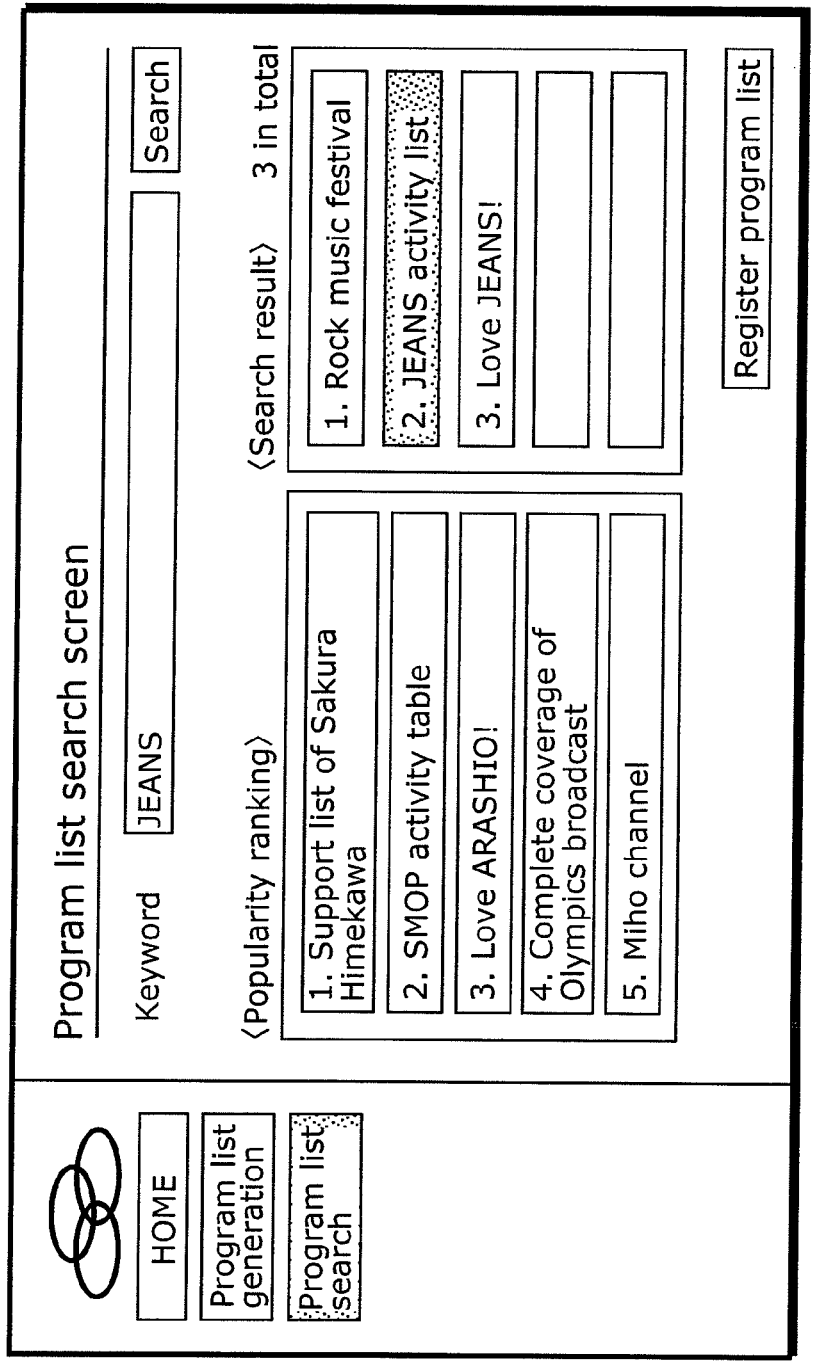
FIG. 12 is a diagram showing an example of a screen on which a program list is selected.
Figure 13:
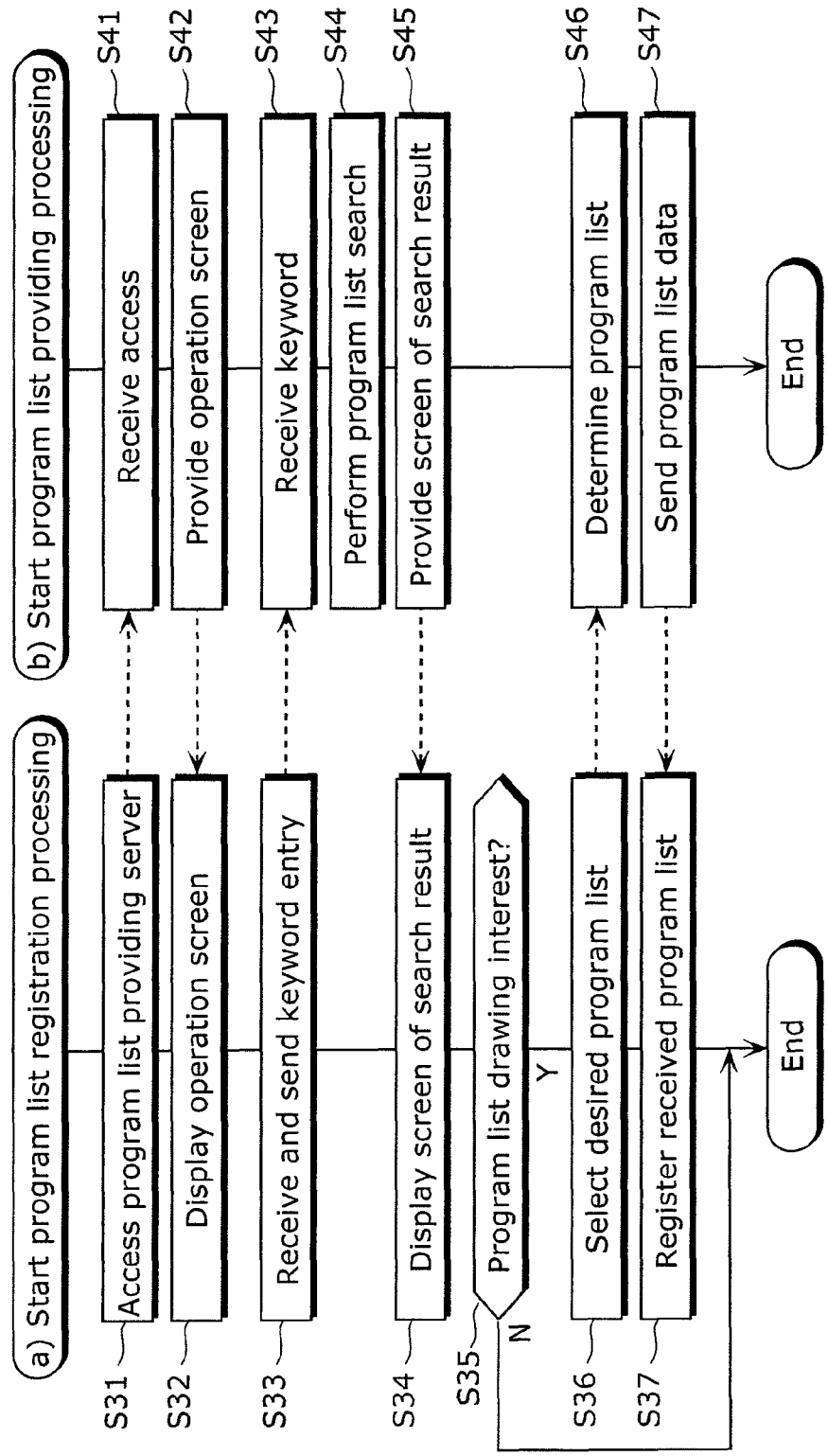
FIG. 13 is a flowchart showing program list registration processing performed by the program recording device shown in FIG. 1.

Next, an explanation is given about a case where the user A living in Chicago located in the central part of the United States as shown in FIG. 5 executes a program recording using the home program recording device 100 on the basis of the program list created by the third party. With reference to FIGS. 12 and 13, an explanation is given about an example of processing where the user A finds the program list created by the user B by performing a program list search and registers the program list in the program recording device 100 used by the user A.

FIG. 12 is a diagram showing an example of a screen on which a program list is selected. FIG. 13 is a flowchart showing program list registration processing performed by the program recording device shown in FIG. 1. FIG. 13 *a*) shows processing performed by the program recording device 100 and FIG. 13 *b*) shows processing performed by the program list providing server 300.

The application 107 of the program recording device 100 used by the user A now accesses the program list providing server 300 connected to the network 200 via the communication unit 108 (S31). The program list providing server 300 receives access from the program recording device 100 (S41). The operation screen providing unit 302 generates a screen element of a program list search screen and sends the screen element to the program recording device 100 (S42).

The program recording device 100 displays the program list search screen on the basis of the received screen element (FIG. 12 and S32). The user A enters a keyword in which the user A has an interest, and presses a "search" button arranged on the screen. Upon the button press by the user A, the application 107 of the program recording device 100 sends the entered keyword to the program list providing server 300 (S33). The program list search unit 305 of the program list providing server 300 searches through at least one program list stored in the program list DB 304 for the program information including the entered keyword (S43 and S44). When the appropriate program list including the appropriate program information or the appropriate program list title and list description is found, the program list search unit 305 reflects the program list in the screen element of a search result screen. When no appropriate program list is found, the program list search unit 305 reflects the search result as "Not available" in the screen element of the search result screen. Then, the program list search unit 305 sends the screen element to the program recording device 100 (S45).

The program recording device 100 displays the search result on the basis of the received screen element (S34). Then, the program recording device 100 receives as to whether or not the user A wants the program list (S35). When there is no program list the user A wants (N in S35), the processing is terminated. On the other hand, when the program list ("JEANS activity list" in this example) in which the user A has an interest is found (Y in S35), the program recording device 100 selects at least one program list. Moreover, when the user A presses a "Register program list" button arranged on the screen (S36), the program list providing server 300 determines the desired program list (S46) and sends the program list data to the program recording device 100 (S47).

The application 107 of the program recording device 100 receives the program list data from the program list providing server 300, requests the program list management unit 109 to register and store the program list, and then terminates the processing here (S37).

Accordingly, through the processing of S31 to S47 explained with reference to FIGS. 12 and 13, the user A can find the program list created by the user B who is considered to be a third party through the search executed by the program list providing server 300 and can register the program list created by the user B in the program recording device 100 used by the user A.

As explained so far, according to the present invention, when programs provided by a plurality of program providing sources are managed in chronological order based on providing dates, providing start times, and providing end times of the programs and the programs are to be viewed and recorded, a program list created by a user that includes a program relating to a specific category or a specific topic is shared via a server so that a third party can easily use this program list in program viewing and program timer-recording.

It should be noted that the program information included in the program list may describe a URL of content (i.e., an Internet broadcast program) distributed via the network 200 as a channel number, for example.

With this construction, not only the programs broadcast using ground-base broadcasting, satellites, or cables, but also content (Internet broadcast programs) distributed via the network such as a mobile communication network or the Internet can be managed in the same program list. Also, since the programs of a plurality of media can be listed in a cross-sectoral manner, programs which cannot be found from the electronic program guide provided by a specific program providing company, such as a broadcast station or a cable television station, can be easily found.

Moreover, even when a third party creating a program list creates the program list on the basis of a different program providing company, viewing or recording of the desired content can be carried out without failure using the program list created by the third party through URL conversion based on the program providing company (the content provider) subscribed to by the user.

Furthermore, when there are two different image qualities for one piece of content, for example, URL conversion based on the equipment capacity of the terminal device allows a higher quality image of content with higher definition to be viewed or recorded.

Next, with reference to FIGS. 14 to 21, an explanation is given about local correction processing performed on the program information when the program recording device 100 used by the user A executes a timer-recording setting of a program using the program list of the user B. With this local correction processing, a recording failure which may be caused due to the difference in the program information because the user A and the user B are living in the different regions is prevented from occurring.

FIG. 14 is a diagram showing an example of broadcast program information of a program providing company (a company A). FIG. 15 is a diagram showing an example of broadcast program information of a program providing company (a company B). The former is a program providing company subscribed to by the user A living in the central part of the United States while the latter is a program providing company subscribed to by the user B living in the Pacific region of the United States.

In the present example, attention is focused on a program called "Acoustic live" which will be broadcast live by both the company A and the company B. This program is included in the above-stated program list created by the user B (FIGS. 7, 9, and 11). As a background, since the user B generates the program information of the program list with reference to a time table (schedule) of the broadcast program information of the program providing company (the company B) subscribed to by the user B, the start time of the program is entered as 21:00 of Pacific time in the United States and the end time of the program is entered as 22:00. Also, since the company B assigns "1" as a channel number to a channel name "MMTV", the channel number is entered as "1" in the program information according to this broadcast channel number of the company B.

Meanwhile, the central part of the United States in which the user A is living has a time-zone difference with the Pacific region of the United States in which the user B is living, and Central time is two hours ahead. For this reason, the program start time of "Acoustic live" to be broadcast live is 23:00 and the program end time is 24:00 according to Central time, as shown in FIG. 14. Also, the company A subscribed to by the user A assigns "2" as a channel number to the channel name "MMTV".

With this being the situation, it is obvious that, when the program information of the program list generated by the user B that is stored in the program list management unit 109 of the program recording device 100 used by the user A is used as it is for the program timer-recording setting, a desired program cannot be correctly recorded because of the differences in the program start time, the program end time, and the channel number. To be more specific, the program list generated by the user B is created only based on the program proving company subscribed to by the user B and on the living environment of the region where the user B is living and, thus, consideration is not given to a case where a third party, such as the user A, may use this program list. On account of this, from the viewpoint of the user A, when the program recording device 100 used by the user A obtains and uses the program list created by a third party, such as the user B, the program information depending on the environment of the third party needs to be corrected to the program information corresponding with the environment of the user A.

The following is a detailed explanation about processing performed by the program recording device 100 to correct the difference in the program information according to the environment of the program recording device 100 before the timer-recording setting processing is performed.

FIG. 16 is a flowchart showing program timer-recording setting processing performed by the program recording device shown in FIG. 1.

The timer-recording setting function of the program recording device 100 is controlled by the application 107 shown in FIG. 2. In general, the user selects a desired program from a display screen of the electronic program guide and directs a timer-recording setting. There are known timer-recording setting methods. For example, a programming code, such as a G code, that identifies a program is entered using numbers or is read using a bar code, and the obtained data is thus transferred to the program recording device 100. As another method example, a desired program is selected from an electronic program guide site which can be browsed using a cellular phone, and a remote message (using an e-mail or a unique protocol of a manufacturer) is sent from a remote location. In the case of the present invention, the program recording device 100 obtains the program list created by the third party from the program list providing server 300 connected to the network 200, and then executes the program timer-recording setting.

The program list management unit 109 of the program recording device 100 used by the user A presently stores the above-stated program list created by the user B, and waits for the user A to turn on the power (S51).

When the user A turns on the power (Y in S51), the application 107 of the program recording device 100 receives a time set to the timer which is internally managed or receives an operating instruction from the user (S52).

When receiving the time set to the timer which is internally managed or receiving the operating instruction from the user (Y in S52), the application 107 determines whether or not the program list exists in the program list management unit 109 (S53). When the program list exists here (Y in S53), the correction processing is performed on each set of program information in the program list (S54).

This processing will be described in detail later. It should be noted that an explanation is given based on the assumption that the program recording device 100 has already obtained the program list and the correction processing is sequentially performed on the program information whose broadcast date and time draws nearer. However, the processing other than the part corresponding to the correction processing may be performed at any timing. For example, the correction processing may be started at the instant when the program list is obtained.

For convenience of explanation, a flow of steps of the program timer-recording setting processing is firstly explained.

When the program information is corrected through the processing of step S54, the application 107 performs preprocessing required for a general timer-recording setting, including confirmation of free space in the accumulation unit 105 of the program recording device 100 (S55). The application 107 registers only the program information assigned with a code indicating "Success" of the correction processing, out of correction processing statuses internally managed by the program list management unit 109, as the information for an authorized timer-recording setting (S56).

FIG. 17 is a diagram showing an example of additional information in the case where the program recording device 100 shown in FIG. 1 internally holds the program list. FIG. 18 is a diagram showing an example of correction processing statuses which the program recording device 100 shown in FIG. 1 internally manages.

In the stated step S56, the program list management unit 109 newly assigns a correction flag and a correction processing status for the internal management to each set of program information in the program list obtained from the program list providing server 300 ("True" is assigned when the execution of the correction processing is completed). As shown in FIG. 18, several states are defined as the correction processing statuses. The status changes according to the processing state of the program information, as shown in FIG. 17. In FIG. 17, since the correction processing has yet to be performed on the $N^{th}$ program information, the value is "False" and the correction processing status is "Null".

The application 107 determines whether or not the timer-recording setting processing has been completed for each set of program information included in the program list (S57). When the timer-recording setting processing has been completed for each set of program information (Y in S57), the application 107 further determines whether or not the correction processing has been completed for each of the program lists stored in the program list management unit 109. When the correction processing has been completed for each of the program lists (Y in S58), the application 107 terminates the program timer-recording setting processing. On the other hand, when the timer-recording setting processing has not been completed for each set of program information included in the program list which is currently in processing (N in S57), the application 107 returns to step S55 and continues the processing. Moreover, when the correction processing has not been completed for each of the program lists (N in S58), the application 107 returns to step S54 and continues the processing for the remaining program lists. Note that, there may be a case where the program information needs to be corrected again later and the timer-recording setting needs to be accordingly updated. For such a case, when the program information is to be registered as the information for an authorized timer-recording setting in the program recording device 100, an identification number identifying the timer-recording setting associated with the program information (i.e., a timer-recording ID) may be managed the same as the correction processing status of the program list management unit 109.

FIG. 19 is a flowchart showing program information correction processing performed by the program recording device shown in FIG. 1. This processing corresponds to step S54 in FIG. 16.

The program information adjustment unit 110 of the program recording device 100 starts the correction processing for the program information in response to a request from the application 107. First, the program information adjustment unit 110 puts a query to the program list providing server 300 via the communication unit 108 as to whether or not the program list has been updated (S101).

The program list management unit 303 of the program list providing server 300 determines whether or not the program list has been updated and sends a result of the determination to the program information adjustment unit 110.

The program information adjustment unit 110 analyzes the received determination result (S102) and, when the program list has been updated (Y in S102), obtains the latest program list from the program list providing server 300. Then, the program information adjustment unit 110 makes a reregistration in the program list management unit 109 and resets all the correction flags to "False" (S103). On the other hand, when the program list has not been updated (N in S102), the program information adjustment unit 110 proceeds to step S104 to continue the processing.

Next, the program information adjustment unit 110 performs initialization processing (setting an internal management variable N to 0) for the correction processing to be performed on the program information which is to be a target candidate used in the correction processing (S104). Then, the program information adjustment unit 110 selects the $N^{th}$ program information as the target of the correction processing (S105). Here, the program information adjustment unit 110 determines whether or not the correction flag internally managed by the program list management unit 109 is "True" (S106). When the correction flag is "True" (Y in S106), the program information adjustment unit 110 determines that the correction processing has already been performed and, thus, selects the $N+1^{th}$ program information as the target of the correction processing (S107). On the other hand, when the correction flag is "False" (N in S106), the program information adjustment unit 110 sets the present program information as the target of the correction processing, and then performs processing to check consistency with the broadcast program information provided by the broadcast program information management unit 106 of the program recording device 100 (S108).

The program information adjustment unit 110 determines whether or not consistency is ensured as a result of the correction processing performed in step S108 (S109). When the determination result is "Consistent" (Y in S109), the program information adjustment unit 110 sets the correction processing status internally managed by the program list management unit 109 as "Success (local correction)" (S110). When the determination result is "Inconsistent" (N in S109), the program information adjustment unit 110 requests the program information correction server 400 connected to the network 200 to perform the correction processing on the program information (S111). The processing performed in step S111 will be explained in detail later.

In this way, the program information adjustment unit 110 repeats the correction processing relating to the $N^{th}$ program information the number of times equal to the number of sets of program information included in the program list (S112), and accordingly finishes the correction processing for all the sets of program information included in one program list.

Figure 20:
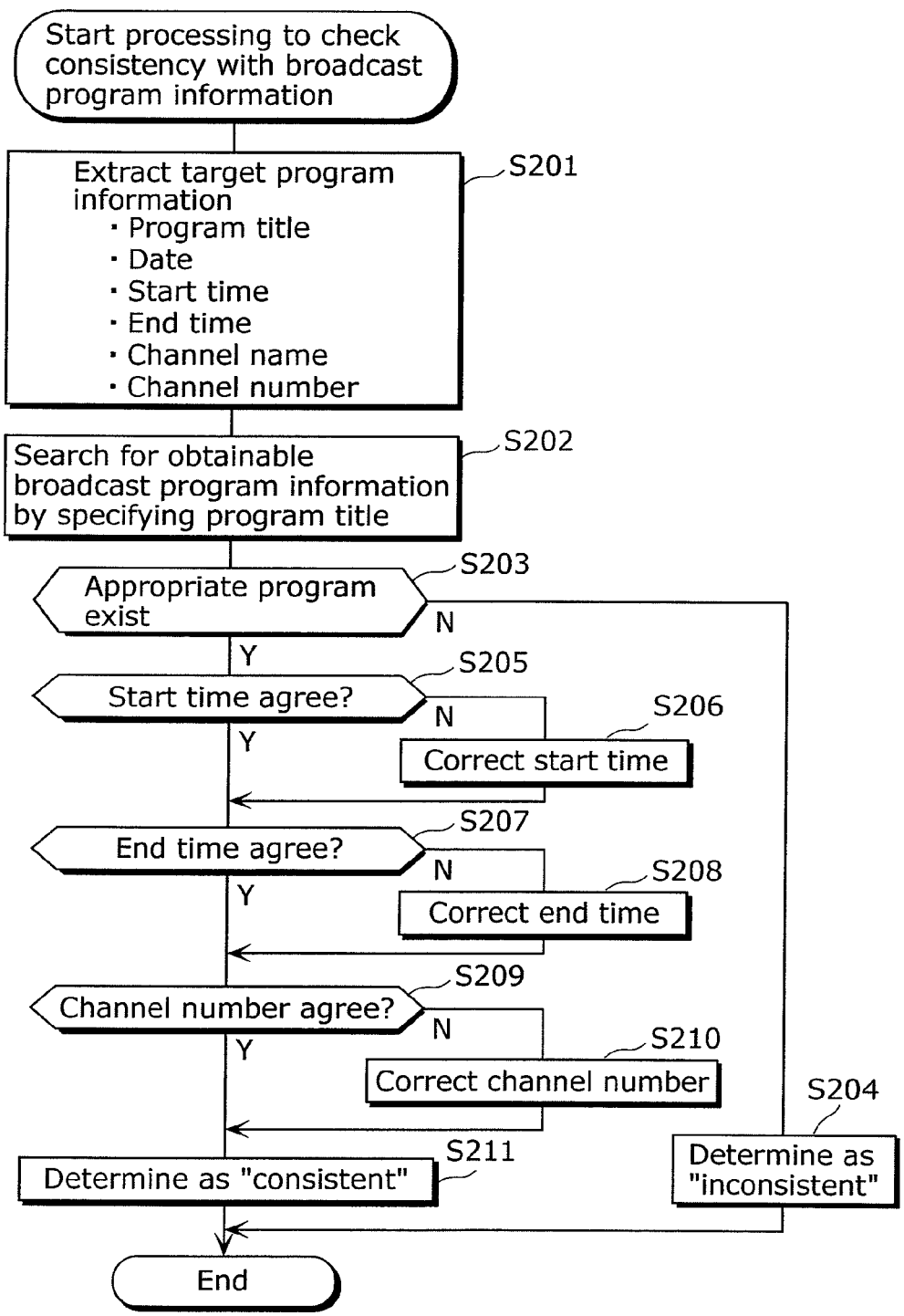
FIG. 20 is a flowchart showing processing performed by the program recording device shown in FIG. 1 to check consistency with broadcast program information.

FIG. 20 is a flowchart showing processing performed by the program recording device 100 shown in FIG. 1 to check consistency with the broadcast program information. As the correction processing for the program information, the program information adjustment unit 110 of the program recording device 100 first attempts to make a comparison with the broadcast program information which can be locally obtained. The local correction processing is explained as follows. This processing corresponds to step S108 in FIG. 19.

Firstly, the program information adjustment unit 110 extracts only the correctable information and the information required for the correction, out of the target program information. For example, the program information includes a program title, a date, a start time, an end time, a channel name, and a channel number (S201). Next, the program information adjustment unit 110 requests for a search, by specifying the program title, through the broadcast program information which can be provided by the broadcast program information management unit 106 (S202). Then, the program information adjustment unit 110 analyzes a return result of the program search and determines whether or not the appropriate program exists (S203). When no appropriate program exists (N in S203), the program information adjustment unit 110 determines as "Inconsistent" and terminates the local correction processing (S204).

On the other hand, when the appropriate program exists (Y in S203), the program information adjustment unit 110 determines whether or not the start time of the correction target agrees with the start time obtained from the broadcast program information (S205). In the case of disagreement (N in S205), the program information adjustment unit 110 makes a correction by overwriting the start time of the correction target with the start time obtained from the broadcast program information (S206). Next, the program information adjustment unit 110 determines whether or not the end time of the correction target agrees with the end time obtained from the broadcast program information (S207). In the case of disagreement (N in S207), the program information adjustment unit 110 makes a correction by overwriting the end time of the correction target with the end time obtained from the broadcast program information (S208). Following this, the program information adjustment unit 110 determines whether or not the channel number of the correction target agrees with the channel number obtained from the broadcast program information (S209). In the case of disagreement (N in S209), the program information adjustment unit 110 makes a correction by overwriting the channel number of the correction target with the channel number obtained from the broadcast program information (S210). Then, at the end of the processing of steps S205 to S210, the program information adjustment unit 110 determines as "Consistent" and terminates the local correction processing (S211).

Figure 21:
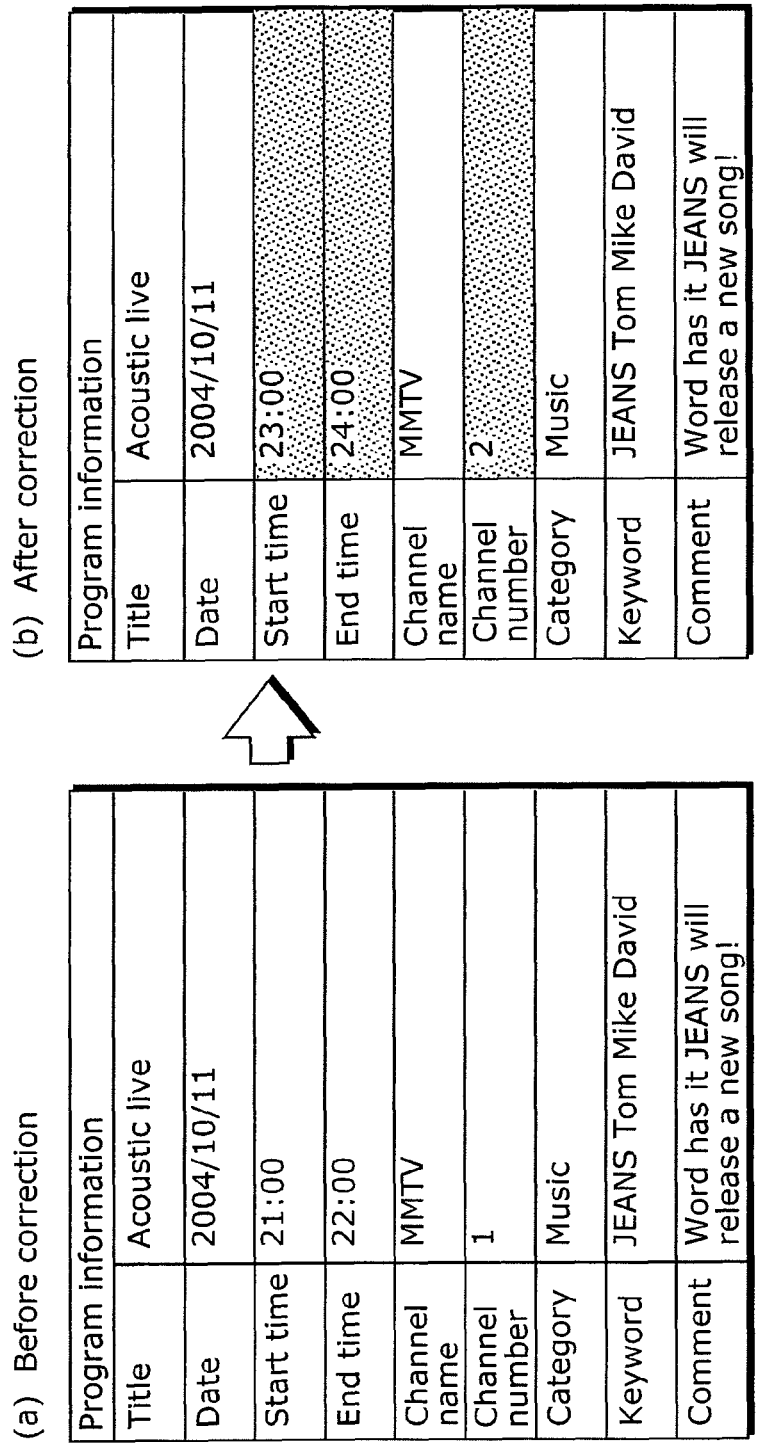
FIG. 21 is a diagram showing an example of program information correction (corrections made to a broadcast time frame and a channel number) through local processing.

FIG. 21 is a diagram showing an example of program information correction (corrections made to a broadcast time frame and a channel number) made through local processing. FIG. 21 (a) shows the program information before correction that is created by the user B. FIG. 21(b) shows the program information after correction that is made through the local correction processing performed by the program recording device 100 used by the user A. This diagram shows that the program information created by the user B is corrected to correspond with the region where the user A is living, using the program information which is shown in FIG. 14 and can be obtained by the broadcast program information management unit 106 of the program recording device 100 used by the user A and through the local correction processing performed in steps S201 to S211 in FIG. 20.

Up to this point, the explanation has been given about the case where the program recording device 100 used by the user A performs the timer-recording setting for the program using the program list created by the user B through the processing of steps S51 to S211 explained with reference to FIGS. 14 to 21. With the local correction processing performed on the program information by the program information adjustment unit 110 of the program recording device 100, a recording failure which may be caused due to the difference in the program information because the user A and the user B are living in the different regions can be prevented from occurring.

Next, an explanation is given about a case where the program recording device 100 used by the user C carries out a timer-recording setting for a program using the program list created by the user B. In the present case, with reference to FIGS. 22 to 30, the explanation is given about the correction processing performed on the program information via a server so as to prevent a recording failure which may be caused due to the difference in the program information because the user B and the user C are living in the different regions and due to descriptive inconsistency of the program information caused by the user B.

The user C shown in FIGS. 5 and 6 is living in New York located in the eastern United States and subscribes to a program providing company (a company C) which is different from the program providing company (the company B) subscribed to by the user B. Moreover, the eastern United States has a time-zone difference with the Pacific region of the United States in which the user B is living, and Eastern time is three hours ahead.

FIG. 22 is a diagram showing an example different from the program information created by the user B that is shown in FIG. 9. As shown in FIG. 22, this program information includes "MMTV A'Live" as a program title which is different from the example shown in FIG. 9. This is because, when entering the program title, the user B entered a popular name, a slang expression, and a shortened expression which the user B daily uses, instead of faithfully entering the program title held in the broadcast program information. Furthermore, in the present program information, "2004/10/12" is entered as the broadcast date of the program. This is because the user made a mistake when entering the broadcast date of the program.

In this way, when a third party, like the user B, manually enters the program information, incorrect information or information that simply disagrees with the broadcast information in comparison can be entered as the program information because of a personal point of view, a custom, a misunderstanding, and an entry error of the user.

The following is an explanation about processing to correct the program information shown in FIG. 22 via a program information correction server connected to the network 200.

The program information including a descriptive mistake and inconsistent information as shown in FIG. 22 is called the "program information including variations". The program list management unit 303 of the program list providing server 300 cannot determine whether or not the user intentionally made the program information including variations. For this reason, the program list management unit 303 does not perform automatic and self-reliant correction on the program information and treats the program information the same as other sets of program information. Also, the program list can accommodate the program information including variations.

Under the circumstances, it is quite possible for the program recording device 100 used by the user C to obtain the program list which has the program information including variations from the program list providing server 300. Here, it is obvious that when the program information including variations is used as it is for the timer-recording setting, the recording will fail due to the inconsistency in the program information.

However, when the appropriate program information is not detected from the broadcast program information in the search processing performed using the program title in step S108 of FIG. 19, that is, steps S201 to S211 of FIG. 20, the local correction processing cannot be performed on the program information. As a result, it is determined in step S109 shown in FIG. 19 that the local correction processing cannot be performed. Thus, a request for the correction processing on the program information needs to be issued to the program information correction server 400 in step S111.

Figure 23:
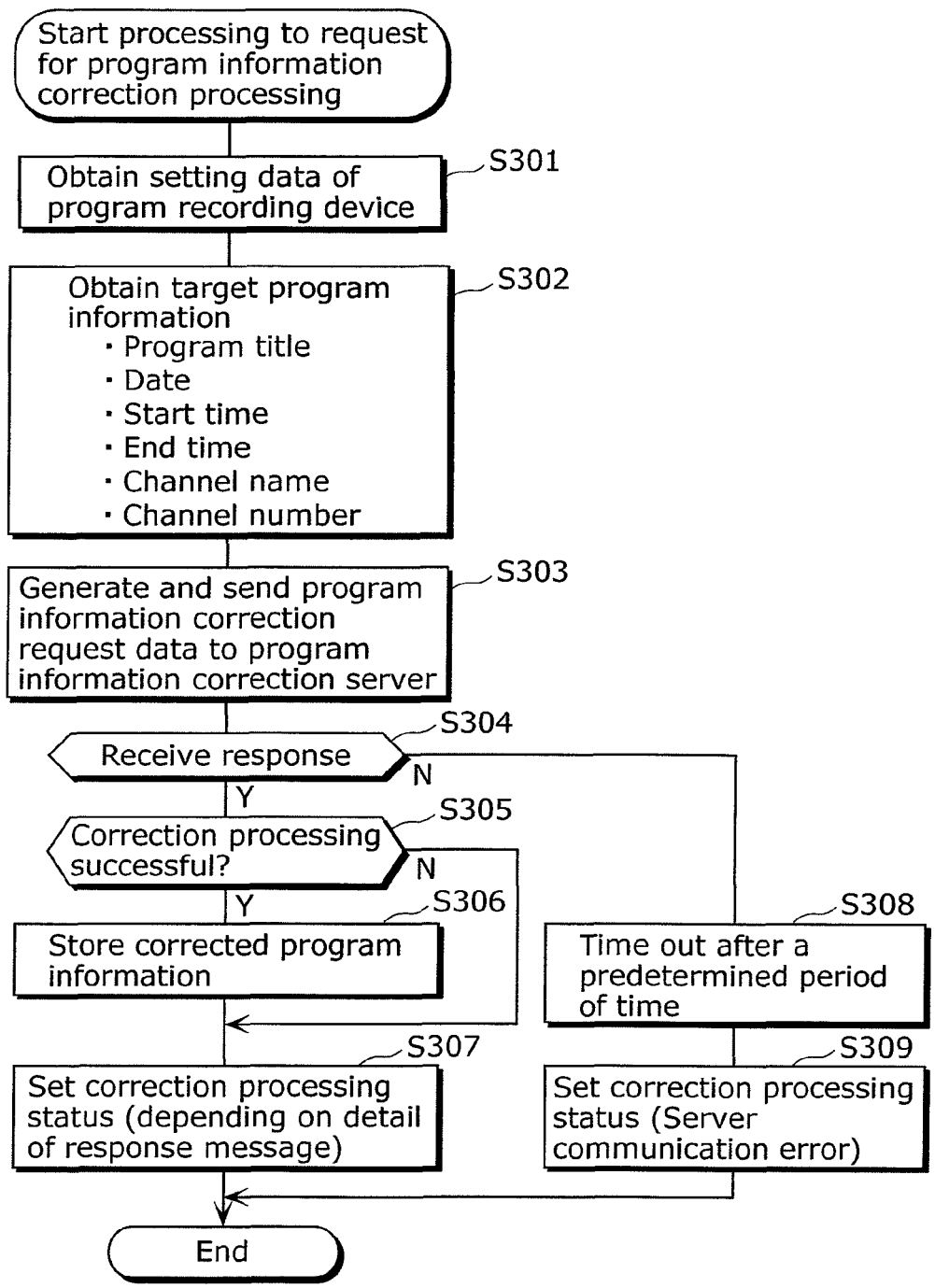
FIG. 23 is a flowchart showing program information correction request processing performed by the program recording device shown in FIG. 1 to make a request to the program information correction server.

FIG. 23 is a flowchart showing program information correction request processing performed by the program recording device 100 shown in FIG. 1 to make a request to the program information correction server 400.

In order to request the program information correction server 400 connected to the network 200 to perform the correction processing on the program information, the program information adjustment unit 110 of the program recording device 100 puts a query to the terminal setting management unit 111 to obtain the setting data required by the program information correction server side for the correction processing (S301). Moreover, the program information adjustment unit 110 puts a query to the program list management unit 109 to obtain the program information which is to be the correction target (S302). Then, the program information adjustment unit 110 generates a message requesting for the program information correction processing, and sends this message to the program information correction server 400 (S303).

The program information adjustment unit 110 receives a response message from the program information correction server 400 (S304), and determines a status of the correction processing performed by the program information correction server 400 (S305). When the status is "Correction processing successful", the program information adjustment unit 110 transfers the received corrected program information to the program list management unit 109 and requests for an overwrite to update the program information (S306). Meanwhile, when the status is "Correction processing failed" (N in S305), the program information adjustment unit 110 transfers the status of the correction processing received from the response message sent by the program information correction server 400 to the program list management unit 109, and requests only for an update of the correction processing status (S307).

When there is no response from the program information correction server 400 in step S304 (N in S304), the program information adjustment unit 110 times out after a predetermined period of time (S308). Then, the program information adjustment unit 110 sets the correction processing status as "Failure because of server communication error" to the program list management unit 109 (S309).

FIG. 24 is a diagram showing an example of setting data. As shown in FIG. 24, the setting data obtained in the stated step S301 includes: a model type of the program recording device 100; information identifying an equipment manufacturer; information identifying a region where the program recording device 100 is installed; information identifying a program providing company subscribed to by the user who owns the program recording device 100; and detailed items set in the program recording device 100, such as parental control, information regarding authorization for an automatic recording of a pay-per-view program, time information set in the program recording device 100, and information as to whether or not daylight saving time is set. It should be noted that the setting data is not limited to this example. For example, the data can be expanded so as to describe information about the user who uses the program recording device 100.

Next, an explanation is given about processing performed by the program information correction server 400. Before a flow of the correction processing performed on the program information is described, an explanation is first given about various kinds of information held in the program information correction server 400.

FIG. 25 is a diagram showing an example of equipment capacity data stored in the equipment information database (DB) 403 of the program information correction server 400. As shown in FIG. 25, the equipment information database 403 lists at least one equipment manufacturer which introduces the program recording device 100 and lists at least one model type code identifying a model type of the program recording device 100 provided by the equipment manufacturer. Moreover, the equipment information database 403 manages the equipment capacity uniquely determined for each model type by a matrix using a number or a binary representation of "supported" or "unsupported". When a request to perform the correction processing on the program information is received from the program recording device 100, the model type information is received at the same time. On account of this, using the equipment information database 403, the equipment capacity of the program recording device 100 which is the source of the request can be understood in advance and the program information recordable by the program recording device 100 can be thus narrowed down according to the model type information.

Note that the following are assumed as examples of this equipment capacity: a potential capacity of the accumulation unit 105 (hard disk) of the program recording device 100; reception of VOD (Video On Demand) content using analogue terrestrial broadcasting, digital terrestrial broadcasting, satellite broadcasting, and the Internet; and reception from a cable television station. However, the items showing the equipment capacity are not limited to these examples. For example, the items can be increased so as to describe whether or not a remote timer function activated from a cellular phone is supported.

Moreover, although the equipment information database 403 is based on the assumption that the equipment information periodically provided by the equipment manufacturers is updated and the updated details are reflected in some way, the updating method does not matter.

FIG. 26 is a diagram showing an example of a channel number conversion table based on program providing sources, that is held by the program information correction server 400 shown in FIG. 1. As shown in FIG. 26, the channel number conversion table lists at least one channel name and completely maps assignments of channel numbers different for each program providing company. This channel number conversion table is based on the assumption that the channel number information of at least one program providing company is mapped. When a request to perform the correction processing on the program information is received from the program recording device 100, the channel information of the program information is received at the same time. Thus, the channel number conversion table can be accordingly used in the processing to convert the channel numbers included in the received channel information to the channel numbers assigned by the program providing company set in the program recording device 100 which is the source of the request.

Although the channel number conversion table is based on the assumption that the channel numbers are updated and the updated details are reflected in some way when the program providing company changes the assignments of the channel numbers, the updating method does not matter.

FIG. 27 shows diagrams of examples of a time-zone difference lookup table that shows a relation between a region where the program recording device of FIG. 1 is installed and a time-zone difference. FIG. 27(*a*) shows a time-zone difference for each region of the United States with respect to Greenwich Mean Time (GMT). FIG. 27(*b*) shows a table created by incorporating daylight saving time into the information shown in FIG. 27(*a*). When a request to perform the correction processing on the program information is received from the program recording device 100, the setting data is received at the same time. Thus, this time-zone difference lookup table can be used in the processing to adjust the program information on the basis of the installation region and the time setting of the program recording device 100 which are included in the received setting data.

Next, a flow of the program information correction processing is explained.

Figure 28:
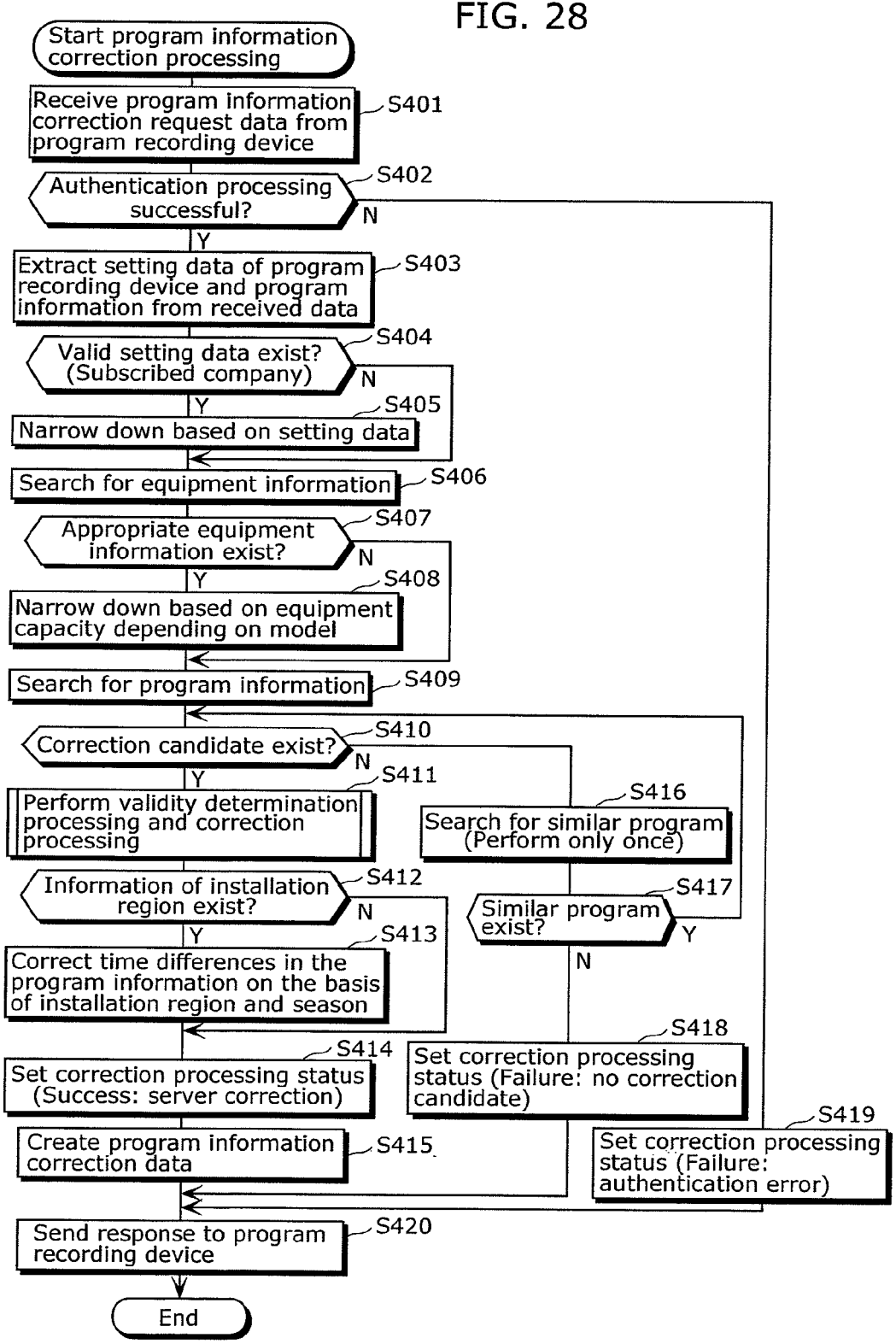
FIG. 28 is a flowchart showing program information search-and-correct processing performed by the program information correction server shown in FIG. 1.

FIG. 28 is a flowchart showing program information search-and-correct processing performed by the program information correction server 400 shown in FIG. 1.

The program information correction server 400 starts the program information correction processing on the basis of a request from the program information adjustment unit 110 of the program recording device 100 (S401). The program information correction control unit 404 of the program information correction server 400 performs authentication processing when an authentication processing option is valid (S402). When the authentication processing is successful (Y in S402), the program information correction control unit 404 proceeds to step S403. On the other hand, when the authentication processing is unsuccessful (N in S402), the program information correction control unit 404 proceeds to step S419.

Next, the program information correction control unit 404 extracts the "setting data" and the "program information of the correction target" from the message requesting for the program information correction processing that is received from the program recording device 100 (S403). Following this, the program information correction control unit 404 determines whether or not the extracted setting data includes the information of the program providing company subscribed to by the user (S404). When determining that the extracted setting data includes the information of the program providing company (Y in S404), the program information correction control unit 404 sets the setting data as the information used for narrowing down the search for the program information (S405). When determining that the extracted setting data does not include the information of the program providing company (N in S404), the program information correction control unit 404 proceeds to step S406. The program information correction control unit 404 next requests the equipment information management unit 402 to search for the equipment information using the model type code, included in the setting data, that identifies the model type of the program recording device 100 used by the user (S406). Then, the equipment information management unit 402 determines whether or not the appropriate equipment information exists in the equipment information database 403 and sends a response to the program information correction control unit 404 (S407). When the appropriate equipment information is determined to exist (Y in S407), the program information correction control unit 404 sets the capacity depending on the model type as the information used for narrowing down the search for the program information (S408). On the other hand, when the appropriate equipment information is determined not to exist (N in S407), the program information correction control unit 404 proceeds to step S409.

After the completion of the above preprocessing, the program information correction control unit 404 generates a program information search request message to request the program information providing server 500 connected to the network 200 to provide the program information. The program information search request message is generated by adding the stated narrow-down information to the program information (such as the program title "MMTV A'Live", the date "2004/10/12", the channel name "MMTV", and the category "Music"). The program information search request message is thus sent to the program information providing server 500 (S409).

The program information search control unit 504 of the program information providing server 500 receives the program information search request message from the program information correction server 400, and searches the program information management unit 502 for the program information on the basis of the narrow-down information. The program information search control unit 504 generates a response message based on the search result from the program information management unit 502, and sends the response message to the program information correction server 400.

The program information correction control unit 404 of the program information correction server 400 receives the response message from the program information providing server 500, analyzes the search result, and determines whether or not there is program information which is to be a correction candidate (S410). When there is no correction candidate (N in S410), the program information correction control unit 404 generates a similar-program search request message, on the basis of the program information, to query as to whether or not a program similar to what is included in the program information of the correction target exists. Then, the program information correction control unit 404 sends the similar-program search request message to the program information providing server 500 (S416). The program information of the similar-program search request message includes the program title "MMTV A'Live", the date "2004/10/12", the channel name "MMTV", the category "Music", and the keywords "JEANS Tom Mike David", for example.

It should be noted that the similar-program search request processing is performed only once, for convenience of explanation. However, in order to achieve the correction with a higher degree of precision, this processing may be repeatedly performed using the other sets of information (such as the comment) included in the program information.

The program information search control unit 504 of the program information providing server 500 receives the similar-program search request message from the program information correction server 400, and searches the program information management unit 502 for similar program information. Suppose here that, in searching for the similar program, the program information search control unit 504 decomposes and analyzes the character string of the program title in the received program information and can obtain in advance similar words using a similar word database which is not shown but held in the program information providing server 500 or using similar word search service provided by a similar word search server connected to the network 200. Here, it is obvious that by narrowing down the search to the "program title" out of the similar words registered in the similar word database, the precision of this similar word search is improved.

For example, the program title "MMTV A'Live" is decomposed into "MMTV" and "A'Live". On the basis of "A'Live", similar words, such as "Asian live", "Unplugged live" and "Acoustic live", can be obtained in advance through the similar word search. To be more specific, through the program search by the search keywords, such as "MMTV and Asian live", "MMTV and Unplugged live", and "MMTV and Acoustic live", it can be expected that the program information of a program called "Acoustic live" which will be broadcast by the channel name of MMTV is found.

Then, the program information search control unit 504 generates a response message on the basis of the search result returned by the program information management unit 502, and sends the response message to the program information correction server 400.

Receiving the response message from the program information providing server 500, the program information correction control unit 404 of the program information correction server 400 analyzes the search result and determines whether or not a similar program exists (S417). When the similar program exists (Y in S417), the program information correction control unit 404 determines again whether or not there is program information which is to be a correction candidate (S410). On the other hand, when it is determined that no similar program exists (N in S417), the program information correction control unit 404 proceeds to step S418.

After obtaining the program information included in the response message received, in response to the similar-program search request message, from the program information providing server 500 (Y in S410), the program information correction control unit 404 performs validity determination processing and correction processing (S411). The validity determination processing is performed to determine whether or not the obtained program information is valid as a basis used for correction. The processing performed in step S411 is explained in detail later.

Here, an explanation is first given about processing to be performed after the validity determination processing and the correction processing are performed by the program information correction control unit 404. On the program information obtained after the correction processing, correction has already been performed on the basis of the program providing company subscribed to by the user and the equipment capacity of the program recording device 100 used by the user. In spite of this, the program recording may fail because daylight saving time is not set in the program recording device 100 used by the user in some cases.

For this reason, the program information correction control unit 404 determines whether or not the setting data includes information of the time setting and of the daylight saving time setting (S412). When the information exists (Y in S412), the program information correction control unit 404 can correct the time differences occurring to the start and end times of the program according to the region, on the basis of the installation region of the program recording device 100 and the season of the scheduled broadcast date of the program (S413).

It should be noted that since an automatic adjustment of time difference can depend on preferences of the user, the program recording device 100 may allow the user to select the setting of "automatic adjustment of time difference in program information correction". On the other hand, when the information of the time setting and of the daylight saving time setting does not exist (N in S412), the program information correction control unit 404 proceeds to step S414.

In this way, when the correction processing of the program information is normally performed, the program information correction control unit 404 sets the correction processing status as "Success (server correction)" (S414) and creates data as the final corrected program information (S415).

When it is determined in step S410 that there is no program information which is to be a correction candidate and it is also determined in step S417 that there is no similar program, the program information correction control unit 404 sets the correction processing status as "Failure (no correction candidate)" (S418). Moreover, when the authentication processing fails in step S402, the program information correction control unit 404 sets the correction processing status as "Failure (authentication error)" (S419).

Then, the program information correction control unit 404 generates a response message on the basis of the program information generated using the result of the above processing and through the correction processing, and sends the response message to the program recording device 100 (S420). Accordingly, the program information adjustment unit 110 of the program recording device 100 can obtain the corrected program information for the correction target program.

Next, the processing performed in step S411 of FIG. 28 is explained in detail.

Figure 29:
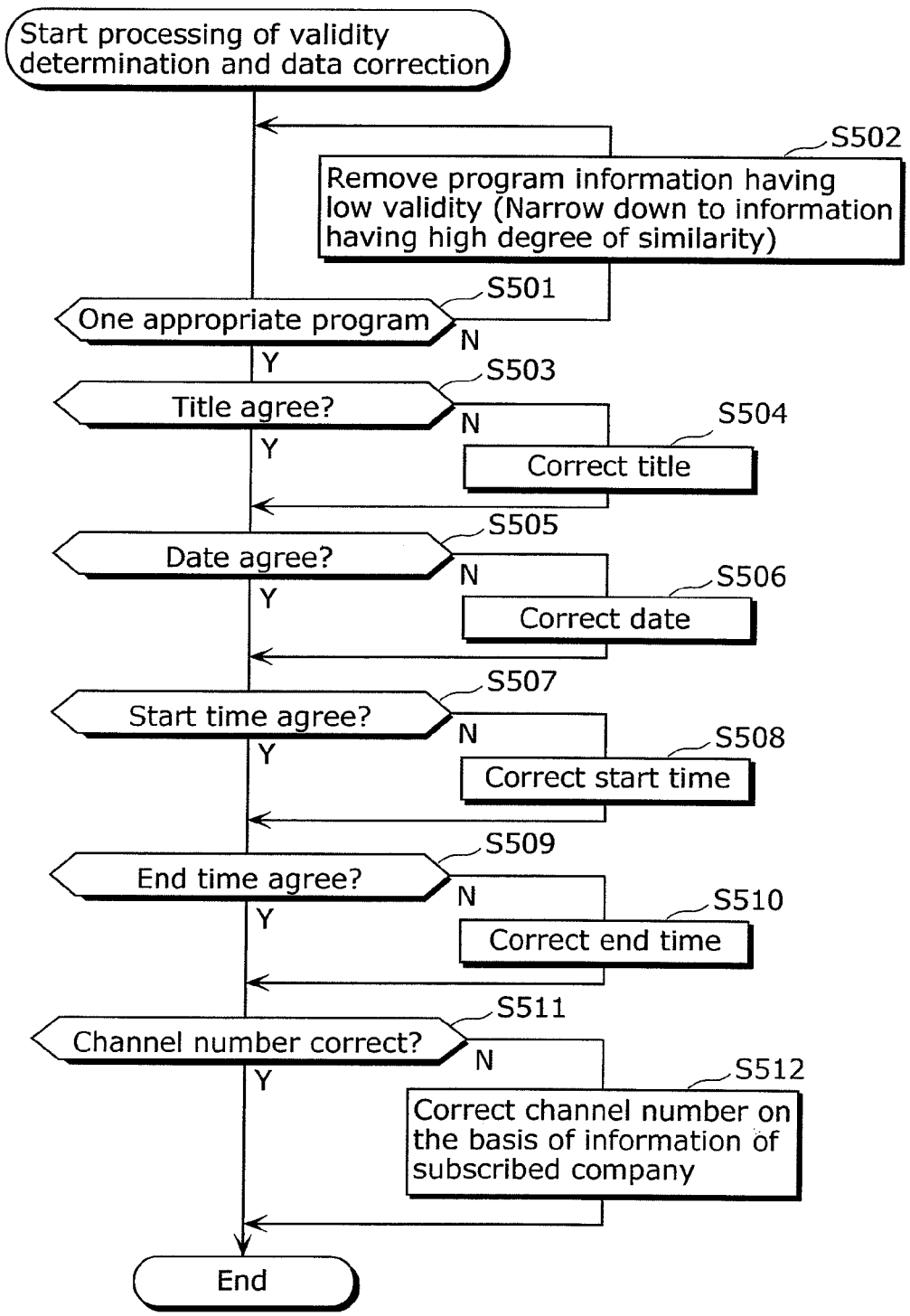
FIG. 29 is a flowchart showing processing of validity determination and data correction performed by the program information correction server shown in FIG. 1.

FIG. 29 is a flowchart showing the processing of validity determination and data correction performed by the program information correction server 400 shown in FIG. 1.

The program information correction control unit 404 of the program information correction server 400 determines whether or not there is one or more sets of program information to be correction candidates that are obtained for the correction target program information (S501). When there is more than one set of program information to be the correction candidate (N in S501), the program information correction control unit 404 removes the program information having low validity for the program desired by the user and thus narrows down to the information having a high degree of similarity (S502).

For example, when more than one set of music program information is provided as a search result obtained using the similar words, such as "Asian live", "Unplugged live", and "Acoustic live", the program information correction control unit 404 prioritizes the program information having agreement with the other sets of information included in the correction target program information, such as keywords, so that the search can be narrowed down. In the present case here, since only the program information of "Acoustic live" describes that a band called "JEANS" will appear on the program, the search can narrow down to this one. Although the search is narrowed down by the keywords in this example, it is not limited to this example. Using the other information elements, the search can be further narrowed down to, for instance, the program information having the same category or the similar broadcast time frame.

After identifying one set of program information as the correction candidate in step S501, the program information correction control unit 404 first compares the program titles (S503). When the program title does not agree with the correction candidate (N in S503), the program information correction control unit 404 corrects the program title of the correction target to the program title of the correction candidate (S504). In the present embodiment, "MMTV A'Live" is corrected to "Acoustic live".

Next, the program information correction control unit 404 compares the broadcast dates (S505). When the broadcast date does not agree with the correction candidate (N in S505), the program information correction control unit 404 corrects the broadcast date of the correction target to the broadcast date of the correction candidate (S506). In the present embodiment, "2004/10/12" is corrected to "2004/10/11".

Next, the program information correction control unit 404 compares the broadcast start times (S507). When the broadcast start time does not agree with the correction candidate (N in S507), the program information correction control unit 404 corrects the broadcast start time of the correction target to the broadcast start time of the correction candidate (S508). In the present embodiment, "21:00" is corrected to "24:00".

After this, the program information correction control unit 404 compares the broadcast end times (S509). When the broadcast end time does not agree with the correction candidate (N in S509), the program information correction control unit 404 corrects the broadcast end time of the correction target to the broadcast end time of the correction candidate (S510). In the present embodiment, "22:00" is corrected to "25:00".

Next, the program information correction control unit 404 compares the channel numbers of the channel on which the broadcast is scheduled (S511). Since the assignment of this channel number is different for each program providing company, the channel number needs to be corrected according to the program providing company subscribed to by the user. To be more specific, although the company B subscribed to by the user B assigns the channel number "1" to the channel name "MMTV", the company C subscribed to by the user C assigns the channel number "5" to this channel. Therefore, the channel number needs to be corrected to "5".

Thus, when the channel number of the correction target does not agree with the channel number of the correction candidate (N in S511), the program information correction control unit 404 performs the channel number conversion on the basis of the program providing company subscribed to by the user and the channel name of the correction candidate, using the channel number conversion table internally held and shown in FIG. 26 (S512). The channel number of the correction target is corrected to the channel number to be obtained after conversion. In the present embodiment, "1" is converted to "5".

According to the procedural steps described above, the program information correction control unit 404 terminates the validity determination processing, which is performed to determine whether the program information is valid as a basis used for correction, and the correction processing of step S411.

In the present embodiment, the explanation has been given about the case, as an example, where the program title, the date, the start time, the end time, and the channel number out of the program information are compared with the respective correction candidates in this order and are accordingly corrected. However, the order and the correction target items are not limited to these. For example, when the program information of the correction candidate supports multiple languages, the items can be extended according to the needs so that, for instance, the program title is corrected to a title in a language (such as French) used by the user on a daily basis.

Figure 30:
FIG. 30 is a diagram showing an example of program information correction (similar-program search, channel correction, and correction of time differences including a difference resulting from daylight saving time) through server processing.

FIG. 30 is a diagram showing an example of program information correction (similar-program search, channel correction, and correction of time differences including a difference resulting from daylight saving time) made through the correction processing of the program information correction server 400. FIG. 30($a$) shows the program information before correction that is created by the user B. FIG. 30($b$) shows the program information after correction that is made through the server processing performed by the program information correction server 400. As shown in FIG. 30, out of the program information of the program list created by the user B, the program title, the date, the start time, the end time, and the channel number are corrected through the processing of the program information correction server 400.

Up to this point, the explanation has been given about the case where the program recording device 100 used by the user C performs the timer-recording setting for the program using the program list created by the user B, through the processing of steps S301 to S512 explained with reference to FIGS. 22 to 30. In the present case, with the correction processing performed on the program information by the program information correction server 400, a recording failure which may be caused due to the difference in the program information because the user B and the user C are living in the different regions and due to descriptive inconsistency of the program information caused by the user B can be prevented from occurring.

Note here that the company D, i.e., the program providing company subscribed to by the user D shown in FIG. 5 does not assign a channel number to the channel name "MMTV" as shown in FIG. 26. More specifically, since the programs of "MMTV" are not broadcast by the company D, the program recording device 100 used by the user D cannot receive these programs. With this being the situation, the program information correction server 400 sets the program information correction status as "No correction (not broadcast)" as shown in FIG. 18 according to the use environment of the user D (in this case, according to the program providing company in the setting data shown in FIG. 24). As a result, the program recording device 100 can remove the program information of the programs which cannot be viewed or timer-recorded.

Moreover, the model type "ZEP-02" of the program recording device 100 used by the user E shown in FIG. 5 cannot receive "Analogue terrestrial broadcasting", "Digital terrestrial broadcasting", and "Satellite broadcasting" as shown in FIG. 25. To be more specific, the program recording device 100 of the company Z that is used by the user E cannot receive the programs of "MMTV" broadcast by satellite broadcasting.

With this being the situation, the program information correction server 400 identifies the equipment capacity depending on the equipment from the equipment information database 403 shown in FIG. 25, using the use environment of the user D (in this case, using the model type in the setting data shown in FIG. 24). When determining, as a result, that it is impossible for the program recording device 100 to receive the programs because of the equipment capacity, the program information correction server 400 sets the program information correction status as "No correction (no capacity)" as shown in FIG. 18. Consequently, the program recording device 100 can remove the program information of the programs which cannot be viewed or timer-recorded.

Figure 31:
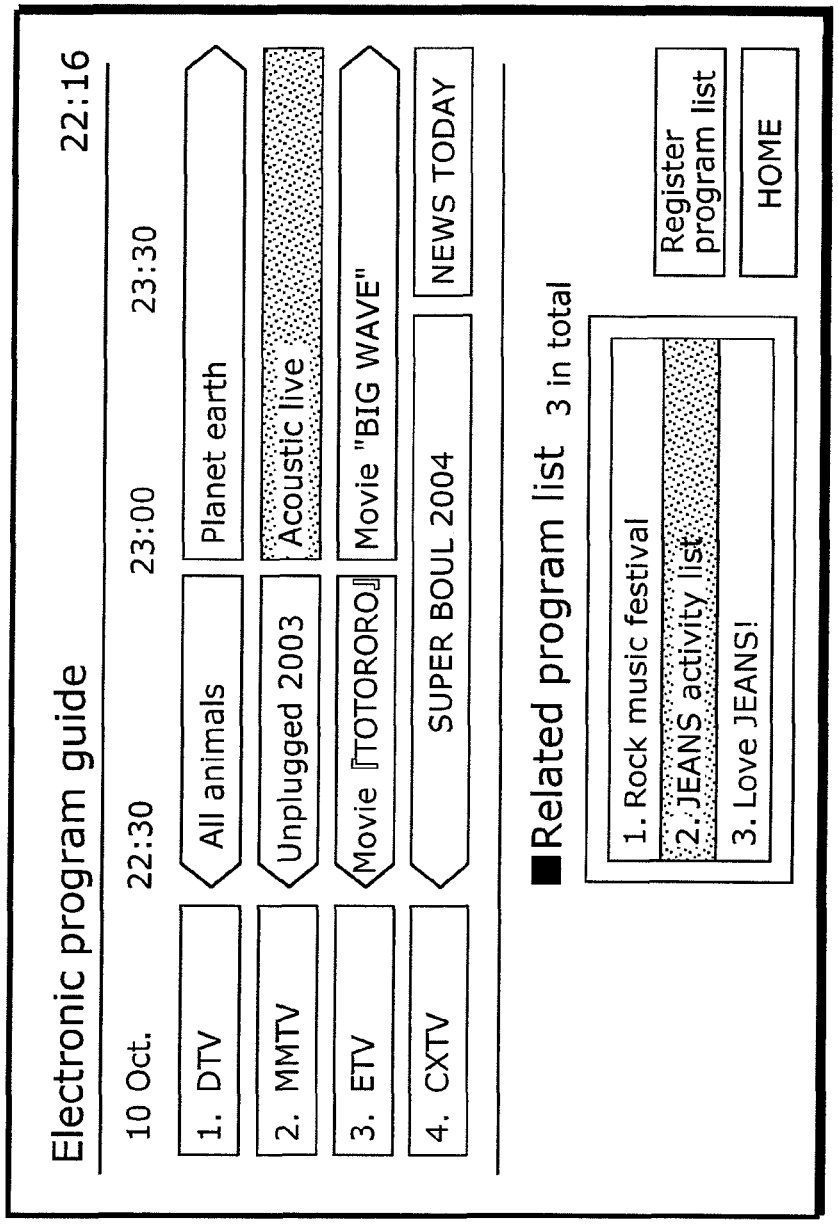
FIG. 31 is a diagram showing another example of display (electronic program guide type) different from the screen shown in FIG. 12.

Moreover, the program list search screen shown in FIG. 12 may be in the form of electronic program guide as shown in FIG. 31. For example, when the user selects a program from the electronic program guide arranged on the screen, the program list including the program information of the selected program can be searched and listed in a "Related program list" box shown on the lower side of the screen. Thus, by pressing a "Register program list" button, the user can register the program list in the program recording device 100 in the same way as in the case shown in FIG. 12 (steps S31 to S47 in FIG. 13).

FIG. 31 is a diagram showing an example to display program lists, as the related program lists, including "JEANS" which is a guest band described in the broadcast program information of the program "Acoustic live" selected by the user.

Also, the screen element of this display may be sent by the program list providing server 300, and the application of the program recording device 100 may display this electronic program guide. Moreover, for displaying the electronic program guide, the application 107 may request the program list providing server 300 to send the program list related to the program selected by the user on the screen displayed by means of an electronic program guide display function of the application 107, and may reflect the response result on the screen.

With this construction, the process of searching for the program list does not require the user to enter the keyword for this search. Instead, the user only has to select the program displayed on the screen of the electronic program guide. Then, the program lists having high relevance to the selected program are shown as selection candidates, so that the user can easily register the desired program list.

The first embodiment has been described on the basis of the program recording device 100. However, it is obvious that the present invention can be applied to a terminal device which executes sequential viewing of programs according to the program list without recording the programs.

In the first embodiment, correction is performed on all the sets of program information of all the registered program lists as shown in steps S54 and S58 of FIG. 16, and all the programs are recorded when free space is determined available in the preprocessing of timer-recording setting. However, the timer-recording setting may be performed, with higher priority being placed on a program having a higher recommendation index in the program information or on a program included in a favorite program list.

In the first embodiment, the program recording device 100 checks consistency with the internally-held broadcast program information as shown in steps S108 to S111 of FIG. 19, and requests the program information correction server to perform the correction processing when consistency is not confirmed. However, without performing the processing to check consistency with the broadcast program information, the program recording device 100 may directly request the program information correction server to perform the correction processing.

In the first embodiment, only at least one set of program information is stored in a program list created by a third party. However, suppose here that the setting profile (including the model type of the program recording device 100 used by the third party, the installation region, the subscribed program providing company, the subscription details, and the user setting) of the third party creating the program list is added to the program list for distribution. With this method, when searching for the program list of the third party and registering this program list, the program recording device 100 compares the setting profile of the user using the program recording device 100 and the setting profile of the third party creating the program list. Through this comparison, the program recording device 100 can determine in advance that, for example, the third party creating the program list subscribes to a pay television channel that cannot be received by the present program recording device 100. Accordingly, the program recording device 100 can avoid, in advance, registration of the program list which the present program recording device 100 cannot potentially process. Also, even in the case where the program list is registered, a time-zone difference because of the different installation regions can be securely determined. In this way, correction which is narrowed down on the basis of the difference between the setting profiles can be made and, therefore, the processing efficiency of the correction processing can be improved.

As explained so far, according to the present invention, when the program viewing or program timer-recording setting is to be executed using the program list created by the third party, the terminal device corrects the program information included in the program list created by the third party according to the use environment of the terminal device. Thus, a failure in the program recording or the program timer-recording which may be caused due to inconsistency in the program information can be prevented from occurring.

Moreover, when the program viewing or program timer-recording setting is to be executed using the program list created by the third party and the terminal device cannot perform internal processing to correct inconsistency of the program information included in the program list created by the third party, the terminal device sends the setting data including the use environment of the terminal device and the program information of the correction target to the server. Since the server corrects the program information according to the use environment of the terminal device, a failure in the program recording or the program timer-recording which may be caused due to inconsistency in the program information can be prevented from occurring.

Furthermore, when the program viewing or program to timer-recording setting is to be executed using the program list created by the third party, the terminal device can identify the program information, out of the information included in the program list created by the third party, that cannot be viewed or timer-recorded depending on the capacity of the terminal device or on a service condition of the subscribed program providing company, through the correction processing. Thus, the terminal device can remove the program information which cannot be potentially processed.

Second Embodiment

The above first embodiment describes a case where the program recording device 100 obtains the program list from the program list providing server 300 and then corrects the program information for itself. Also, in the first embodiment, when the program information cannot be corrected by the program recording device 100, the program recording device 100 requests the program information correction server 400 to correct the program information, so that the program viewing or recording is executed using the program information corrected by the server. Here, the following cases can also be considered: a case where a set of program information is individually corrected after the program recording device 100 obtains the program list; and a case where the program list in which the program information has already been corrected is obtained.

In the present embodiment, an explanation is given about a case where the program list providing server 300 corrects the program information included in the program list in advance before providing the program list to the program recording device 100.

Figure 32:
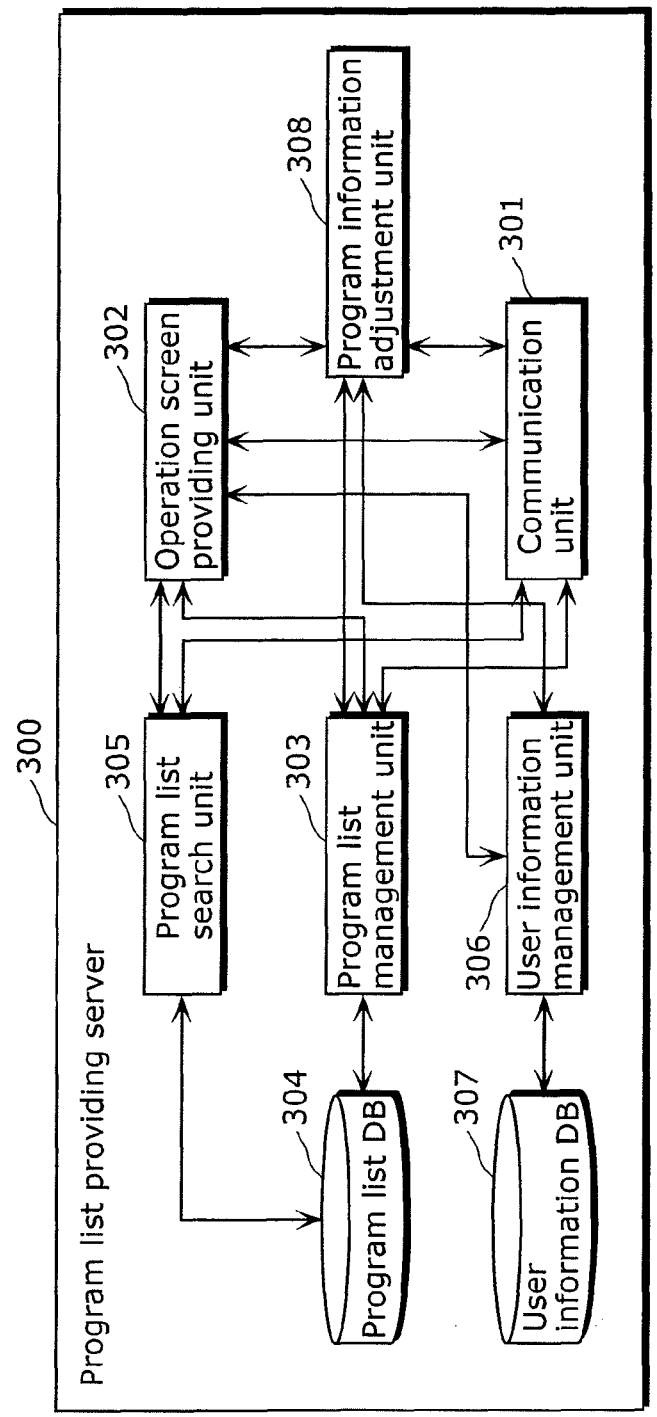
FIG. 32 is a block diagram showing an internal configuration of the program list providing server shown in FIG. 1, according to a second embodiment of the present invention.

FIG. 32 is a block diagram showing an internal configuration of the program list providing server 300 shown in FIG. 1, according to the second embodiment of the present invention.

Note that configurations represented by respective block diagrams of the program recording device 100, the program information correction server 400, and the program information providing server 500 are the same as those shown in FIGS. 2 and 4 in the first embodiment. In FIG. 32, a major difference with the first embodiment shown in FIG. 3 is that a user information management unit 306, a user information database (user information DB) 307, and a program information adjustment unit 308 are added. The user information management unit 306 manages various kinds of information about the user who uses the program list providing server 300. The user information database (user information DB) 307 accumulates profile information of the user added through registration processing. In response to a request from the operation screen providing unit 302, the program information adjustment unit 308 corrects the program information included in the program list held by the program list management unit 303, on the basis of the setting data regarding the use environment of the user that is obtained via the user information management unit 306. The other components in FIG. 32 are the same as those shown in FIG. 3 and, therefore, the same numerals as in FIG. 3 are assigned to these components to avoid redundancy.

Figure 33:
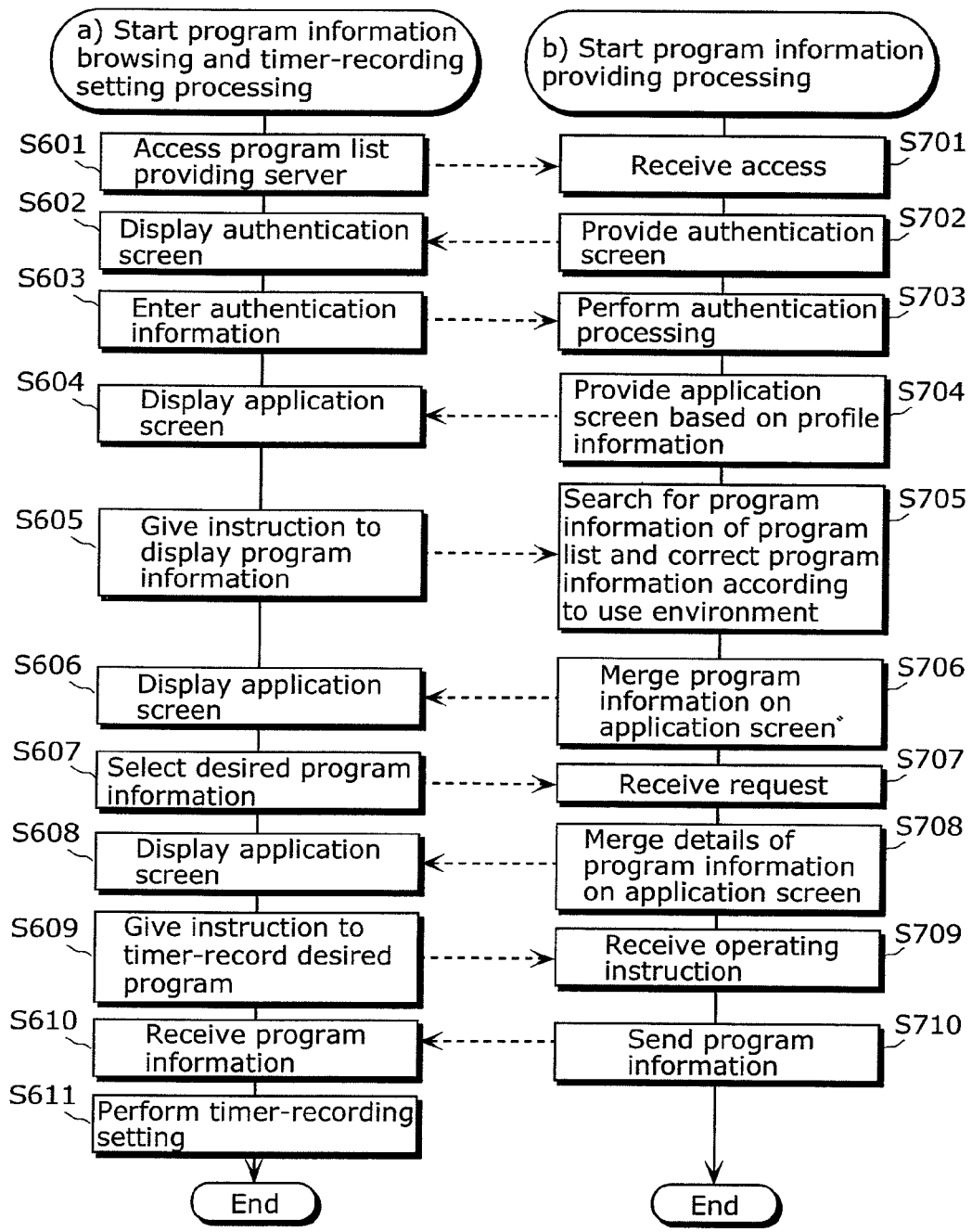
FIG. 33 is a diagram showing a flowchart of program information browsing and program timer-recording setting processing performed by the program recording device shown in FIG. 1, and a flowchart of program information providing processing performed by the program list providing server shown in FIG. 32.
Figure 34:
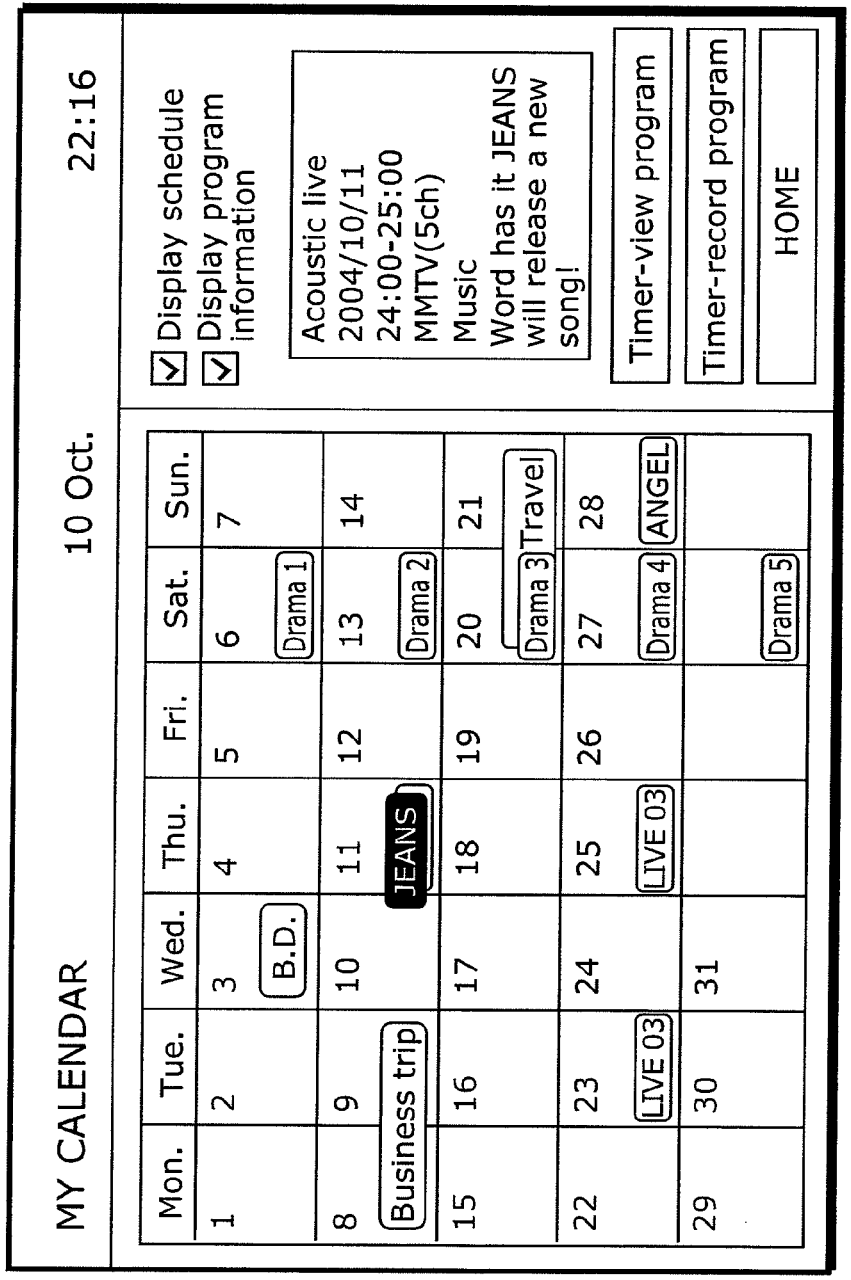
FIG. 34 is a diagram showing an example of a screen on which a plurality of sets of program information are browsed on a calendar and an instruction for timer-viewing setting or timer-recording setting is given.

FIG. 33 *a*) and *b*) are flowcharts of: (a) program information browsing and program timer-recording setting processing performed by the program recording device shown in FIG. 1; and (b) program information providing processing performed by the program list providing server shown in FIG. 32. FIG. 34 is a diagram showing an example of a screen on which a plurality of sets of program information are browsed on a calendar and an instruction for timer-viewing or timer-recording is issued.

Suppose here that the information of the user who uses the program list providing server 300 and the setting data of the program recording device 100 used by the user have already been registered in the user information database 307, and that at least one user activity schedule has already been registered in the user information database 307 as well.

Also suppose that the application 107 of the program recording device 100 functions as a browser and thus can display a calendar screen provided by the program list providing server 300. Here, with reference to FIGS. 33 and 34, an explanation is given about processing performed by the application 107 to display the calendar screen and to execute a program timer-recording setting after the server corrects the program information according to the use environment of the program recording device 100.

Following an instruction given through a user operation, the application 107 of the program recording device 100 accesses the program list providing server 300 which provides the calendar screen (S601).

Receiving access from the program recording device 100, the operation screen providing unit 302 of the program list providing server 300 sends a screen element forming an authentication screen (S702).

On the basis of the received screen element, the program recording device 100 displays the authentication screen (S602), and allows the user to enter the authentication information (S603).

After receiving the authentication information, the operation screen providing unit 302 of the program list providing server 300 executes the authentication processing (S703). When it is determined that the authentication processing is performed properly, the operation screen providing unit 302 obtains the profile information of the user from the user information database 307 via the user information management unit 306, and generates and sends a screen element such that at least one registered user activity schedule is merged on the calendar screen (S704).

On the basis of the received screen element, the program recording device 100 displays the calendar screen on which the user activity schedule has been merged (S604).

Here, the user performs an operation to turn on a checkbox of "Display program information" arranged on the screen of the program recording device 100 (S605).

Following this, the operation screen providing unit 302 of the program list providing server 300 confirms the presence of the program list having been registered in advance in the user information management unit 306 by the user. When the program list is present, the operation screen providing unit 302 searches through the program information included in the appropriate program list for the program information which is scheduled to be broadcast during a period of time displayed as the calendar screen (for example, October 2004). Then, the operation screen providing unit 302 requests the program information adjustment unit 308 to request the program information correction server 400 shown in FIG. 1 to perform the correction processing on the program information. As a result of this processing, the program information adjustment unit 308 corrects the program information found through the search, according to the use environment of the user (including the model type of the program recording device 100 used by the user, the installation region, the program providing company subscribed to by the user, the subscription details, and the detailed user setting) (S705).

Next, the operation screen providing unit 302 generates a screen element such that the corrected program information is merged on the calendar screen, and sends the screen element to the program recording device 100 (S706).

On the basis of the received screen element, the program recording device 100 displays the calendar screen on which the corrected program information has been merged (S606).

Then, when the user selects certain program information among from a plurality of sets of program information displayed on the screen, the program recording device 100 makes a request to request the program information correction server 400 to perform the correction processing on the program information (S607).

Receiving the program information selected by the user (S707), the operation screen providing unit 302 of the program list providing server 300 generates and sends a screen element such that the detailed information of the program information is merged in a dedicated display window on the right side of the screen (S708).

Consequently, the program recording device 100 displays the screen as shown in FIG. 34 (S608). Here, the user can confirm the activity schedule of the user and the program information on the same screen. For example, since a travel is scheduled for October 20 to 21, the user finds out that the user will not be able to view the drama series that the user views every Saturday. Accordingly, the user can issue an instruction to set a timer-recording for the program that the user will not be able to view at home.

Next, an explanation is given about a case where the program information displayed on the calendar screen is selected and the program timer-recording setting is carried out on the basis of the program information.

At the instant when the user presses a "Timer-record program" button arranged on the screen, the program recording device 100 sends an operating instruction to the program list providing server 300 (S609).

Receiving the operating instruction from the program recording device 100 (S709), the operation screen providing unit 302 of the program list providing server 300 sends the designated program information to the program recording device 100 (S710).

Receiving the corrected program information from the program list providing server 300 (S610), the application 107 of the program recording device 100 executes the program timer-recording setting processing (S611).

Here, the correction processing performed by the program list providing server 300 in step S705 can be easily realized by replacing the program recording device 100 with the program list providing server 300 in the correction processing performed by the program recording device 100 and the program information correction server 400 according to the first embodiment. Hence, the detailed explanation of the processing is omitted here.

Moreover, in the present embodiment, the explanation has been given about the case where the program information is limited to the program information scheduled to be broadcast during a period of time corresponding to the displayed period of the calendar and the program list providing server 300 corrects the program information. As another method, by sequentially referring to the program lists managed by the program list management unit 303 during idle time when the program list providing server 300 is under light load, all the sets of program information included in the program lists may be corrected according to the user environment of the user.

Also, the calendar display on the screen is only shown as one example and, thus, the arrangement of each part on the screen and the display method are not limited to this example. For instance, the calendar may be changed to display weekly so that the activity schedule and the program information of a day can be displayed more on the screen. With this, the program information can be displayed more and, also, the detailed information can be displayed more in a window for each set of program information.

Through the processing performed in steps S601 to S710 as described with reference to FIGS. 32 to 34, when the program viewing or program timer-recording setting is to be carried out using the program list created by the third party, the program list providing server corrects in advance the program information included in the program list according to the use environment previously obtained, and then provides the corrected program information. Consequently, the correction processing to be performed by the terminal device or the communication cost required for the correction can be reduced.

As explained so far, the present invention allows the program list to be presented on the calendar by the merging operation such that the activity schedule of the user and the program broadcast schedule can be confirmed by comparison on the same screen. Thus, the user can easily decide as to whether to execute a timer-viewing setting in order to view the program at the broadcast time that the user intends to view or execute a timer-recording setting in order to record and view the program.

Next, an explanation is given about a case where the user finds the program list on the calendar display screen provided by the program list providing server 300.

Figure 35:
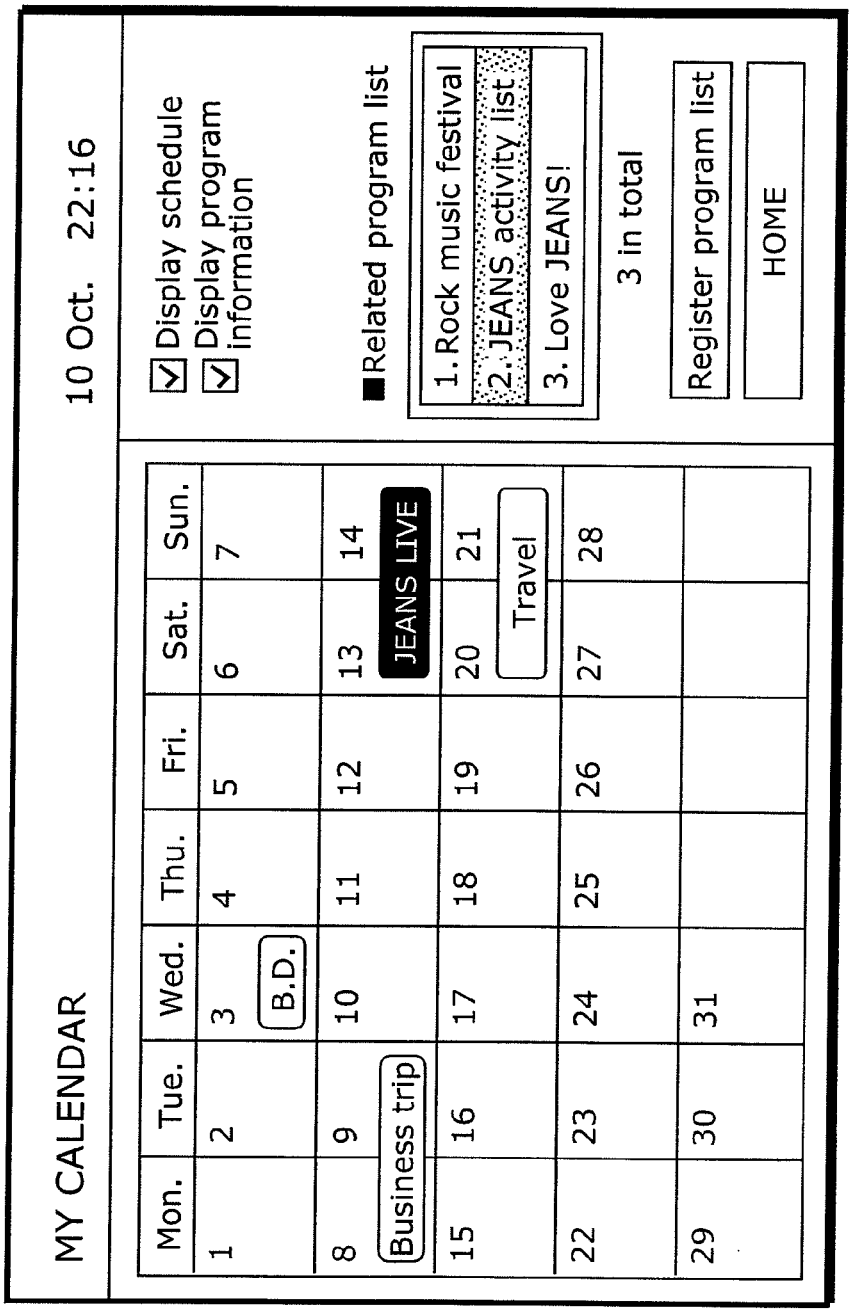
FIG. 35 is a diagram showing another example of display (calendar display type) different from the screen shown in FIG. 12.

FIG. 35 is a diagram showing another example of display (calendar display type) different from the screen shown in FIG. 12. The first embodiment shows an example of the screen on which the program list is searched for, with reference to FIG. 12. In the present case here, since the program list providing server 300 manages the registered activity schedule of the user, the program list providing server 300 can generate a screen element such that the activity schedule of the user is merged and displayed on the calendar screen as shown in FIG. 35.

For example, when the user selects a scheduled activity in which the user has an interest from the activity schedule of the user displayed on the screen, the operation screen providing unit 302 of the program list providing server 300 extracts text included in the selected scheduled-activity and requests the program list search unit 305 to search for the program list using the extracted keyword. When the program list search unit 305 finds the program lists which have the program information including the keyword, the operation screen providing unit 302 provides the corrected program lists to the program recording device 100.

On the basis of the provided program lists, the program recording device 100 can list the found program lists in a "Related program list" box on the right side of the screen.

By pressing the "Register program list" button arranged on the screen, the user can register the program list to the program recording device 100 in the same way as in the case shown in FIG. 12 (steps S31 to S47 in FIG. 13). FIG. 35 shows an example where the program lists that have a proper name "JEANS" included in the scheduled activity "JEANS LIVE" selected by the user are displayed as the related program lists.

Note here that, in order to display this calendar on the screen, the program list providing server 300 may send a screen element to the program recording device 100, so that the application 107 of the program recording device 100 can display the calendar screen. Then, the application 107 may request the program list providing server 300 to obtain the program lists related to the scheduled activity selected by the user on the screen displayed by means of a calendar display function of the application 107, and may reflect the response result on the screen.

With this construction, the process of searching for the program list does not require the user to enter the keyword for this search. Instead, the user only has to select the scheduled activity displayed on the calendar screen. Then, the program lists having high relevance to the selected scheduled activity are shown as selection candidates, so that the user can easily register the desired program list.

Also note that the application 107 of the program recording device 100 functions as a browser and thus can display an electronic program guide provided by the program list providing server 300. Here, with reference to FIG. 36, an explanation is given about processing in which the program list providing server 300 corrects the program information according to the use environment of the program recording device 100 before displaying the electronic program guide, and executes a timer-recording setting for the desired program on the screen of the electronic program guide.

First suppose that the information of the user who uses the program list providing server 300 and the setting data of the program recording device 100 used by the user have already been registered in the user information database 307, and that at least one program list has already been registered in the user information database 307.

Figure 36:
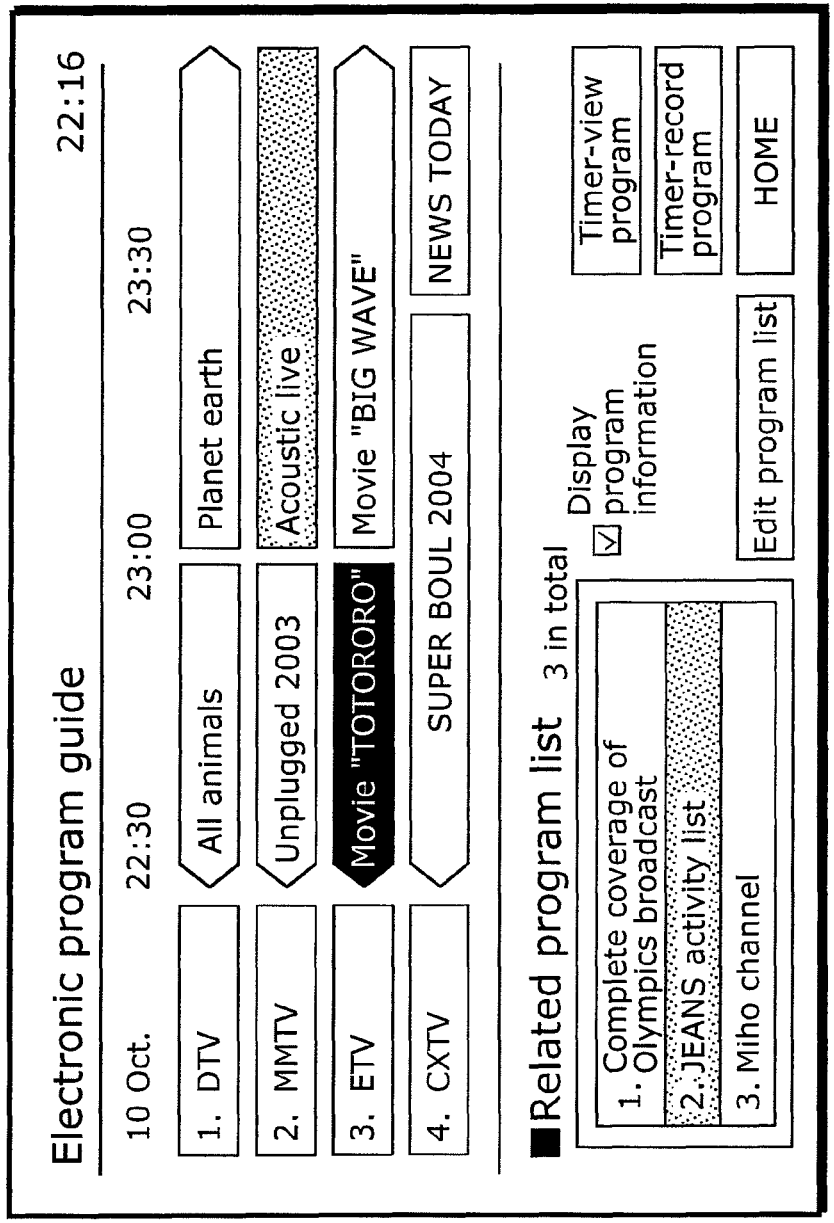
FIG. 36 is a diagram showing an example of a screen on which the program information included in the program list is browsed on an electronic program guide screen and an instruction for timer-viewing setting or timer-recording setting is given.

FIG. 36 is a diagram showing an example of a screen of the program recording device 100 on which the program information included in the program list is browsed on the electronic program guide screen and an instruction for timer-viewing or timer-recording is issued.

It should be noted that the basic flow of processing performed by the program recording device 100 is the same as the processing shown by the flowchart of FIG. 33 used in the explanation about the example of the calendar display screen, except that "application" described in FIG. 33 needs to be replaced with "electronic program guide". Thus, a detailed explanation is omitted, and steps subsequent to step S604 in FIG. 33 are described.

Here, the user performs an operation to turn on a checkbox of "Display program information" arranged on the screen (S605).

Following this, the operation screen providing unit 302 of the program list providing server 300 confirms the presence of the program list having been registered in advance in the user information management unit 306 by the user. When the program list is present, the operation screen providing unit 302 searches through the program information included in the appropriate program list for the program information which is scheduled to be broadcast during a period of time displayed as the electronic program guide screen (for example, 22:30 to 24:00 on Oct. 10, 2004). Then, the operation screen providing unit 302 requests the program information adjustment unit 308 to request the program information correction server 400 shown in FIG. 1 to perform the correction processing on the program information. As a result of this processing, the program information adjustment unit 308 corrects the program information found through the search, according to the use environment of the user (including the model type of the program recording device 100 used by the user, the installation region, the program providing company subscribed to by the user, the subscription details, and the detailed user setting) (S705). Next, the operation screen providing unit 302 generates a screen element such that the corrected program information is merged on the electronic program guide screen, and sends the screen element to the program recording device 100 (S706).

On the basis of the received screen element, the program recording device 100 displays the electronic program guide screen on which the corrected program information has been merged (S606).

Note here that the period of time to be displayed may follow the display setting of the electronic program guide. In such a case, however, the program information without consideration for the time-zone differences cannot be displayed. On account of this, it is desirable to internally retrieve a period of time longer than the period described in the display setting (for example, a period having one more day at each end of the period currently described in the display setting) and to merge the program information corrected on the basis of the setting data.

Then, when the user selects certain program information among from a plurality of sets of program information displayed on the screen, the program recording device 100 makes a request to request the program information correction server 400 to perform the correction processing on the program information (S607).

The operation screen providing unit 302 of the program list providing server 300 receives the program information selected by the user (S707). The operation screen providing unit 302 generates a screen element such that: a detailed information display window which is not shown is displayed adjacent to the program selected by the user by the effect of pop-up or the like so that the detailed information of the program information is merged; and all the program boxes of the program information included in the program list are merged in different colors. Then, the operation screen providing unit 302 sends the merged screen element (S708).

Thus, the program recording device 100 displays the screen on the basis of the received screen element (S608). Here, the user can recognize the sets of program information included in the program list which the user registered in the past as the program windows in different colors, and confirm the programs in comparison with each other on the same screen. For example, the user can visually confirm that the program in which the user is interested is to be broadcast from 23:00 on October 10 or that the timer-recording setting has been performed for this program. Also, regarding the other programs, since the timer-recording setting has not been performed for any program before 23:00, the user can issue an instruction to perform a timer-recording setting for a movie called "TOTORORO" to be broadcast on a channel name "ETV", for example.

Next, an explanation is given about a case where the program information displayed on the electronic program guide is selected and the program timer-recording setting is carried out on the basis of the program information.

At the instant when the user presses a "Timer-record program" button arranged on the screen, the program recording device 100 sends an operating instruction to the program list providing server 300 (S609).

Receiving the operating instruction from the program recording device 100 (S709), the operation screen providing unit 302 of the program list providing server 300 sends the designated program information to the program recording device 100 (S710).

Receiving the corrected program information from the program list providing server 300 (S610), the application 107 of the program recording device 100 executes the program timer-recording setting processing (S611).

In the present embodiment, the explanation has been given about the case where the program information is limited to the program information scheduled to be broadcast during a period of time corresponding to the displayed period of the electronic program guide and the program list providing server 300 corrects the program information. As another method, by sequentially referring to the program lists managed by the program list management unit 303 during idle time when the program list providing server 300 is under light load, all the sets of program information included in the program lists may be corrected according to the user environment of the user.

Also, the electronic program guide display on the screen is only shown as one example and, thus, the arrangement of each part on the screen and the display method are not limited to this example. For instance, the electronic program guide screen may be changed to display weekly so that the programs to be broadcast on a day and the program information included in the program list can be displayed more on the screen. Alternatively, free space of hard disk may be represented by a circle graph, so that the screen can display how much space of the hard disk is required when all the sets of program information in the registered program lists are automatically recorded. Or, the screen may display how many days are left before the remaining free space of the hard disk is to be used up.

Through the processing performed in steps S601 to S710 as described with reference to FIG. 36, when the program viewing or program timer-recording setting is to be carried out using the program list created by the third party, the program list providing server corrects in advance the program information included in the program list according to the use environment previously obtained, and then provides the corrected program information. Consequently, the correction processing to be performed by the terminal device or the communication cost required for the correction can be reduced.

As explained so far, the present invention allows the program list to be presented on the electronic program guide by the merging operation such that other broadcast programs and the programs included in the program list can be confirmed by comparison on the same screen. Thus, the user can easily decide as to whether to execute a timer-viewing setting in order to view the program at the broadcast time that the user intends to view or execute a timer-recording setting in order to record and view the program.

The second embodiment has been described on the basis of the program recording device 100. However, it is obvious that the present invention can be applied to a terminal device which executes sequential viewing of programs according to the program list without recording the programs.

Moreover, in the second embodiment, the explanation has been given about the case where the program list providing server 300 corrects the program information before sending the program list to the program recording device 100. Here, as a correction method, statistics on the program information included in a plurality of program lists created by the third party may be collected, and the program titles and a distribution manner of the program start and end times of the program information considered to relate to the same program may be examined. With this, the precision of searching for the similar programs can be improved and, therefore, the correction processing can be performed with a higher degree of precision.

Furthermore, based on the result of the statistics mentioned above, the program list management unit 303 of the program list providing server 300 can determine that the program information which is registered more often to be a popular program and can accordingly generate a new program list based on the ranking. That is, a "popular program list" can be provided.

(First Different Implementation)

A program list providing server, a terminal device, a program information correction server, a program information correction system, and a program viewing-recording system according to the first different implementation are as follows.

The program list providing server according to the first different implementation includes: a communication unit which sends and receives data to and from a program list provider or a program list user via a network; a program list management unit which manages a program list including at least one set of program information, the program list being provided by the program list provider; a program list database which holds at least one program list; and a program list search unit which searches for and provides an appropriate program list in response to a request from the program list user.

The program list providing server according to the first different implementation includes: a user information database which holds at least one set of schedule information of the program list user; a user information management unit which manages the schedule information; and an operation screen providing unit which provides a screen displaying, on the same calendar, the schedule information and the program information included in the program list corresponding to a specified period of time.

Also, the operation screen providing unit of the program list providing server according to the first different implementation searches for a program list using data included in the schedule information as a key, displays the appropriate program list on the same screen, and sends the appropriate program list to a terminal device of the program list user following an operating instruction.

The program list providing server according to the first different implementation further includes: a user information database which holds at least one set of terminal setting data of the program list user; a user information management unit which manages the terminal setting data; and an operation screen providing unit which obtains, via the communication unit, the program information usable under a use environment of the program list user on the basis of the terminal setting data and provides a screen displaying, on the same electronic program guide (EPG), broadcast program information and the program information included in the program list corresponding to a specified period of time.

Moreover, the operation screen providing unit of the program list providing server according to the first different implementation searches for a program list using data included in the selected broadcast program information as a key, displays the appropriate program list on the same screen, and sends the appropriate program list to the terminal device of the program list user following an operating instruction.

Furthermore, the operation screen providing unit of the program list providing server according to the first different implementation requests, via the communication unit, an external server connected to the network to adjust the program information before having the program information displayed, and displays the program information corrected by the external server or sends the corrected program information as the program list to the terminal device.

The program information included in the program list of the program list providing server according to the first different implementation includes information locating a source of content (URL) distributed via the network.

The program list management unit of the program list providing server according to the first different implementation collects statistics on the program information included in a plurality of program lists provided by a third party and examines program titles and a distribution manner of the program start and end times of the program information considered to relate to the same program, thereby improving the precision of searching for a similar program.

The program list management unit of the program list providing server according to the first different implementation determines, on the basis of a result of the statistics on the program information, that the program information which is registered more often to be a popular program and generates a new program list as a "popular program list" using the program information having been registered a number of times.

The terminal device according to the first different implementation includes: a communication unit which sends and receives data to and from an external server connected to a network; a receiving unit which receives video forming a program and broadcast program information; a broadcast program information management unit which manages the broadcast program information obtained from the receiving unit; a program list management unit which manages the program list obtained from the external server and program information included in the program list; a terminal setting management unit which manages terminal setting data of the terminal device; and a program information adjustment unit which compares at least one set of program information included in the program list with the broadcast program information and corrects a detail of the program information on the basis of the terminal setting data. The terminal device carries out viewing and recording using the program information corrected by the program information adjustment unit.

Moreover, when determining that it is impossible to correct the detail of the program information only by comparison with the broadcast program information held by the broadcast program information management unit, the program information adjustment unit of the terminal device according to the first different implementation requests, via the communication unit, the external server connected to the network to correct the program information and then uses the program information corrected by the external server for the program viewing or recording.

Furthermore, when determining, as a result of correcting the program information on the basis of the setting data, that it is impossible to view or record the program using the program information, the program information adjustment unit of the terminal device according to the first different implementation assigns an information flag indicating that the present program information cannot be used, so that the program is not to be viewed or recorded.

The program information correction server according to the first different implementation includes: a communication unit which sends and receives data to and from a terminal device of a program list user and an external server connected to a network; an equipment information management unit which manages equipment information regarding at least one piece of equipment used by the program list user; and a program information correction control unit which, in response to a request from the program list user, compares at least one set of program information which is a correction target sent from the terminal device of the program list user with program information obtained from the external server and corrects a detail of the program information on the basis of terminal setting data sent from the terminal device.

The program information correction system according to the first different implementation includes a program list providing server and a program information correction server. The program list providing server includes: a communication unit which sends and receives data to and from a program list provider or a program list user via a network; a program list management unit which manages a program list including at least one set of program information, the program list being provided by the program list provider; a program list database which holds at least one program list; and a program list search unit which searches for and provides an appropriate program list in response to a request from the program list user. The program information correction server includes: a communication unit which sends and receives data to and from an external server connected to a network; an equipment information management unit which manages equipment information regarding at least one piece of equipment used by the program list user; and a program information correction control unit which, in response to a request from the program list providing server, compares at least one set of program information which is a correction target sent from the program list providing server with program information obtained from the program information providing server and corrects a detail of the program information on the basis of terminal setting data sent from the program list providing server.

The program viewing-recording system according to the first different implementation includes a terminal device and a program information correction server. The terminal device includes: a communication unit which sends and receives data to and from an external server connected to a network; a receiving unit which receives video forming a program and broadcast program information; a broadcast program information management unit which manages the broadcast program information obtained from the receiving unit; a program list management unit which manages the program list obtained from the external server and program information included in the program list; a terminal setting management unit which manages terminal setting data of the terminal device; and a program information adjustment unit which compares at least one set of program information included in the program list with the broadcast program information and corrects a detail of the program information on the basis of the terminal setting data. The terminal device carries out viewing and recording using the program information corrected by the program information adjustment unit. The program information correction server includes: a communication unit which sends and receives data to and from a terminal device of a program list user and an external server connected to a network; an equipment information management unit which manages equipment information regarding at least one piece of equipment used by the program list user; and a program information correction control unit which, in response to a request from the program list user, compares at least one set of program information which is a correction target sent from the terminal device of the program list user with program information obtained from the program information providing server and corrects a detail of the program information on the basis of terminal setting data sent from the terminal device.

(Second Different Implementation)

The following is an explanation of a broadcast program information usage system according to the second different implementation.

Note that, as a variation of the broadcast program information usage system according to the second different implementation described below, a first variation (a broadcast program information usage system (a program recording system) of a narrower concept 1) may be configured by adding all included in the above first embodiment to the broadcast program information usage system according to the second different implementation. Moreover, a second variation (a broadcast program information usage system (a program recording system) of a narrower concept 2) may be configured by adding all included in the above second embodiment to the broadcast program information usage system according to the second different implementation. It should be noted that the broadcast program information usage system (the program recording system) of the narrower concept 1 is presented by the entire description including the explanation given in the first embodiment and the following explanation. Also note that the broadcast program information usage system (the program recording system) of the narrower concept 2 is presented by the entire description including the explanation given in the second embodiment and the following explanation.

(A) The broadcast program information usage system (the program recording system) according to the second different implementation includes:

a broadcast program information usage device (a program recording device 100) which uses broadcast program information that is information of a broadcast program;

a broadcast program information holding device (a different program recording device 100 other than the present program recording device 100, a program list providing server) which holds broadcast program information created by a third party other than a user of the broadcast program information usage device, the held broadcast program information being corrected before being used by the broadcast program information usage device;

a communication unit (such as a communication unit 501) which sends the held broadcast program information to the broadcast program information usage device;

a holding unit (a program list management unit 109, a program information management unit 502, a program list management unit 303) which holds identification information (such as EPG information, program information of a program information providing server 500) identifying a correspondence relation between the broadcast program information, which is a correction target, held by the broadcast program information holding device and the post-correction broadcast program information obtained after the correction is performed on the present broadcast program information; and a correction unit (a program information adjustment unit 110, a program information correction control unit 404, a program information adjustment unit 308) which corrects the broadcast program information sent from the communication unit to the post-correction broadcast program information which is associated with the present broadcast program information by the held identification information, before the broadcast program usage device uses the broadcast program information.

In this way, the broadcast program information is corrected by the broadcast program information usage system according to the second different implementation. This can solve the problem of usage failure, such as a failure in program viewing or program timer-recording due to a difference in the program start times between the user of the broadcast program information usage device and the third party creating the broadcast program information because of their different living regions.

To be more specific, when the broadcast program information created by the third party is sent and is to be used, the correction unit corrects the broadcast program information in advance before usage. Thus, the broadcast program information usage device can be prevented from inappropriately using the broadcast program information and, accordingly, can appropriately use the broadcast program information with reliability.

It should be noted that, for example, the holding unit may use an obtainment unit (such as the communication unit 501) which obtains the identification information held by a predetermined obtainment-destination holding device that is an outside or inside source of the broadcast program information usage system. Thus, the holding unit may obtain the identification information from the obtainment-destination holding device using the obtainment unit, and then hold the obtained identification information.

(B) The holding unit of the broadcast program information usage system according to the second different implementation holds the identification information which is the post-correction broadcast program information (the EPG information, the program information of the program information providing server 500).

The identification information which is the post-correction broadcast program information identifies a correspondence relation by which the program information considered to be corrected to the post-correction broadcast program information is individually associated with the post-correction program information.

(C) According to the broadcast program information usage system of the second different implementation, the broadcast program information includes a plurality of items, such as a title and a start time of a broadcast program relating to the broadcast program information, the holding unit holds the broadcast program information, and the correction unit corrects an item which needs to be corrected out of the held broadcast program information and sets the broadcast program information obtained after the item correction as the post-correction broadcast program information.

In this case here, note that the broadcast program information considered to be corrected to the post-correction broadcast program information includes at least one item having the same description as the corresponding item of the post-correction broadcast program information.

(D) According to the program information usage system of the second different implementation, the broadcast program information usage device uses a list including at least one set of broadcast program information, the broadcast program information usage device holds a list including at least one set of broadcast program information, the communication unit sends the held list to the broadcast program information usage device so that each set of broadcast program information included in the list is used by the broadcast program information usage device, and the correction unit corrects each set of broadcast program information included in the list, that is, corrects each item included in each set of broadcast program information.

(E) The program recording system of the narrower concept 1 (the first variation) which is presented by an explanation given by adding the explanation of the first embodiment to the above explanation may be configured. Also, the program recording system of the narrower concept 2 (the second variation) which is presented by an explanation given by adding the explanation of the second embodiment to the above explanation may be configured. Moreover, a different variation of the second different implementation, other than the present first and second variations, may be configured.

(Other Variations)

Although the present invention has been described on the basis of the above embodiments, it is obvious that the present invention is not limited to the above embodiments. The present invention includes cases such as the following.

(1) Specifically speaking, each of the above devices is a computer system including a microprocessor, a ROM, a RAM, a hard disk unit, a display unit, a keyboard, and a mouse. The RAM or the hard disk unit stores computer programs. The microprocessor operates in accordance with the computer programs, so that each device performs its function. Here, a computer program includes a plurality of instruction codes that indicate a command to be issued to the computer in order for a predetermined function to be carried out.

(2) Some or all of the components included for each of the above devices may be realized by a single LSI (Large Scale Integration). A system LSI is a super multi-function LSI which is manufactured by integrating a plurality of components onto a single chip. To be more specific, a system LSI is a computer system including a microprocessor, a ROM, and a RAM. The RAM stores computer programs. The microprocessor operates in accordance with the computer programs, so that the system LSI performs its function.

(3) Some or all of the components included for each of the above devices may be realized by an IC card which can be attached to and removed from the device or by a stand-alone module. Each of the IC card and the module is a computer system including a microprocessor, a ROM, and a RAM. Each of the IC card and the module may include the above-mentioned super multi-function LSI. The microprocessor operates in accordance with the computer programs, so that the IC card or the module performs its function. Each of the IC card and the module may be tamper-resistant.

(4) The present invention may be the methods described above. Also, these methods may be computer programs realized by a computer, or may be digital signals including the computer programs.

Moreover, the present invention may be realized by recording the computer programs or the digital signals in a computer-readable recording medium, such as a flexible disk, a hard disk, a CD-ROM, an MO, a DVD, a DVD-ROM, DVD-RAM, a BD (Blu-ray Disc), and a semiconductor memory. Or, the present invention may be the digital signals recorded in these recording media.

Furthermore, the present invention may be realized by transmitting the computer programs or the digital signals via a telecommunication line, a wired or wireless communication line, a network typified by the Internet, and data broadcasting.

Also, the present invention may be a computer system including a microprocessor and a memory. The memory may store the computer programs, and the microprocessor may operate in accordance with the computer programs.

Moreover, the present invention may be carried out by an independently separate computer. For doing so, the programs or the digital signals recorded in the recording medium may be transferred, or the programs or the digital signals may be transmitted via the network or the like.

(5) The above embodiments and the above variations may be combined.

INDUSTRIAL APPLICABILITY

The program viewing system and the program recording system of the present invention can be applied to, for example, a digital television receiver, a digital video disk recorder, a set-top box, and a set-top box having a program recording function.

The invention claimed is:

1. A terminal device comprising:
a communicator configured to send and receive data to and from an external server connected to a network and obtain a program list indicating one or more sets of program information which is to be a viewing processing target used by a third party and a timer-recording setting processing target used by a third party, from among one or more sets of program information included in first broadcast program information;
a receiver configured to receive video forming a program and second broadcast program information;
a broadcast program information manager configured to manage the second broadcast program information obtained from said receiver;
a program list manager configured to manage the program list obtained from the external server and the viewing processing target or the timer-recording setting processing target included in the program list;
a terminal setting manager configured to manage setting data of said terminal device;
a program information adjuster configured to correct at least one of the viewing processing target or the timer-recording setting processing target included in the program list on the basis of the setting data; and
an outputter configured to provide (i) the viewing processing target when corrected by said program information adjuster and (ii) the timer-recording setting processing target when corrected by said program information adjuster,
wherein the second broadcast program information includes a title, a date, a start time, and an end time, and
said program information adjuster is configured to:
set at least one set of program information included in the program list as correction candidate program information;
perform extraction processing to extract program information having a title corresponding to a title included in the correction candidate program information, from among one or more sets of program information included in the second broadcast program information; and
correct the date, the start time, or the end time of the correction candidate program information corresponding to the program information extracted from the second broadcast program information when (i) the program information is extracted in the extraction processing and (ii) the date, the start time, or the end time of the correction candidate program information is different from the date, the start time, or the end time of the program information extracted from the second broadcast program information.

2. The terminal device according to claim 1,
wherein said program information adjuster is configured to request, via said communicator, the external server connected to the network to perform correction processing on the at least one of the viewing processing target or the timer-recording setting processing target included in the program list.

3. The terminal device according to claim 1,
wherein said program information adjuster is configured to compare the at least one of the viewing processing target or the timer-recording setting processing target included in the program list with the second broadcast program information, and correct a detail of the viewing processing target or the timer-recording setting processing target on the basis of the setting data.

4. The terminal device according to claim 1,
wherein the second broadcast program information further includes at least one of a channel name, providing-source identification information, program identification information, a channel number, a category, a sub-category, a brief description, appearing guest information, related-program information, a keyword given by a providing source, a keyword given by a third party, a comment made by the providing source, a comment made by a third party, age-limit information, and a viewing expiration date.

5. The terminal device according to claim 1,
wherein the second broadcast program information further includes information, other than video content received by said receiver, that identifies a location of content distributed via the network.

6. The terminal device according to claim 1,
wherein the setting data includes at least one of: a model type identifying a time of manufacture and a capacity of said terminal device; an equipment manufacturer which manufactured said terminal device; an installation region indicating a region where said terminal device is installed; providing-source identification information identifying a program providing source from which said terminal device can receive data; a parental control setting of said terminal device; a recording authorization setting of said terminal device for an automatic recording of a pay-per-view program; a time setting of said terminal device; a daylight saving time setting of said terminal device; a language setting of said terminal device; and a keyword set by a user of said terminal device to indicate an interest and a taste.

7. The terminal device according to claim 1,
wherein the detail to be corrected includes at least one of: a difference due to a time-zone difference; a difference due to a daylight saving time setting; a difference in a descriptive manner due to one of an entry error and a difference in expression made by a third party when the third party creates the program list; a difference due to a different subscription; a difference due to a different processing capacity of said terminal device; a difference due to a different setting of said terminal device; and a difference between the viewing processing target or the timer-recording setting processing target at the present moment and one of information obtained when the program list was created and information obtained when the viewing processing target or the timer-recording setting processing target was created.

8. The terminal device according to claim 1,
wherein said program list manager is configured to hold the setting data added to the program list obtained from the external server via said communicator, in association with the viewing processing target or the timer-recording setting processing target included in the program list.

9. The terminal device according to claim 1,
wherein, when determining, as a result of correcting the viewing processing target or the timer-recording setting processing target on the basis of the setting data, that it is impossible to view or record the program using the viewing processing target or the timer-recording setting processing target, said program information adjuster is configured to assign an information flag indicating that the viewing processing target or the timer-recording setting processing target cannot be used, so that the program is not to be viewed or recorded.

10. A program information correction method comprising:
sending and receiving data to and from an external server connected to a network and obtaining a program list indicating one or more sets of program information which is to be a viewing processing target used by a third party and a timer-recording setting processing target used by a third party, from among one or more sets of program information included in first broadcast program information;
receiving video forming a program and second broadcast program information;
managing the received second broadcast program information;
managing the program list obtained from the external server and the viewing processing target or the timer-recording setting processing target included in the program list;
managing setting data of a terminal;
comparing at least one of the viewing processing target or the timer-recording setting processing target included in the program list with the second broadcast program information;
correcting the at least one of the viewing processing target or the timer-recording setting processing target included in the program list on the basis of the setting data; and
providing the viewing processing target when corrected and providing the timer-recording setting processing target when corrected,
wherein the second broadcast program information includes a title, a date, a start time, and an end time, and
said correcting the at least one of the viewing processing target or the timer-recording setting processing target includes:
setting at least one set of program information included in the program list as correction candidate program information;
performing extraction processing to extract program information having a title corresponding to a title included in the correction candidate program information, from among one or more sets of program information included in the second broadcast program information; and
correcting the date, the start time, or the end time of the correction candidate program information corresponding to the program information extracted from the second broadcast program information when (i) the program information is extracted in the extraction processing and (ii) the date, the start time, or the end time of the correction candidate program information is different from the date, the start time, or the end time of the program information extracted from the second broadcast program information.

\* \* \* \* \*